US012720413B2

(12) United States Patent
Tu et al.

(10) Patent No.: US 12,720,413 B2
(45) Date of Patent: Aug. 25, 2026

(54) LOCATION SERVICE ENTITY SELECTION METHOD AND APPARATUS, AND ELECTRONIC DEVICE AND READABLE STORAGE MEDIUM

(71) Applicant: ZTE CORPORATION, Shenzhen (CN)

(72) Inventors: Xiaoyong Tu, Shenzhen (CN); Junyi Liu, Shenzhen (CN); Minya Ye, Shenzhen (CN); Xiliang Liu, Shenzhen (CN); Fangting Zheng, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 321 days.

(21) Appl. No.: 18/573,127

(22) PCT Filed: Jun. 24, 2022

(86) PCT No.: PCT/CN2022/101111

§ 371 (c)(1),
(2) Date: Dec. 21, 2023

(87) PCT Pub. No.: WO2023/274064

PCT Pub. Date: Jan. 5, 2023

(65) Prior Publication Data

US 2024/0292317 A1 Aug. 29, 2024

(30) Foreign Application Priority Data

Jun. 30, 2021 (CN) ......................... 202110737288.0

(51) Int. Cl.
*H04W 48/04* (2009.01)
*H04W 8/14* (2009.01)
*H04W 64/00* (2009.01)

(52) U.S. Cl.
CPC ............. *H04W 48/04* (2013.01); *H04W 8/14* (2013.01); *H04W 64/00* (2013.01)

(58) Field of Classification Search
CPC ........ H04W 48/04; H04W 8/14; H04W 64/00
(Continued)

(56) References Cited

U.S. PATENT DOCUMENTS

2019/0053010 A1* 2/2019 Edge ..................... H04W 4/029

FOREIGN PATENT DOCUMENTS

CN 110913473 A 3/2020
CN 111770539 A 10/2020
(Continued)

OTHER PUBLICATIONS

European Patent Office, the Extended European Search Report (EESR) dated May 12, 2025, for corresponding EP application No. 22831878.8.

(Continued)

*Primary Examiner* — Michael R Neff
(74) *Attorney, Agent, or Firm* — Li & Cai Intellectual Property (USA) Office

(57) ABSTRACT

The present disclosure provides a location service entity selection method and apparatus, an electronic device, and a readable storage medium, and relates to the technical field of communications. The method includes: acquiring service capability information of a candidate location service entity from a preset storage space according to location requirement information of a user equipment (UE), and determining a target location service entity according to the service capability information of the candidate location service entity.

17 Claims, 8 Drawing Sheets

(58) Field of Classification Search
USPC ........................................................ 455/435.1
See application file for complete search history.

(56) References Cited

FOREIGN PATENT DOCUMENTS

| | | | |
|---|---|---|---|
| CN | 111836182 | A | 10/2020 |
| WO | WO2020057344 | A1 | 3/2020 |
| WO | WO2020167615 | A1 | 8/2020 |
| WO | WO 2020192270 | A1 | 10/2020 |

OTHER PUBLICATIONS

"3rd Generation Partnership Project; Technical Specification Group Services and System Aspects; Study on Enhancement the 5GC Location Services (release 16)", 3GPP Standard, Technical Report, Dec. 19, 2018.
Ericsson: "Study on enhancement to the 1-15 H04L67/61 5GC location services", 3GPP Draft; R2-1817723 Study on Location Service Exposure to NG-RAN, 3rd Generation Partnership Project (3GPP), dated Nov. 2, 2018.
"3rd Generation Partnership Project; Technical Specification Group Services and System Aspects; 5G System (5GS) Location Services (LCS); Stage 2 (release 17)", 3GPP Draft, Apr. 20, 2021.
China Mobile: "local network exposure with LLMF",3GPP Draft; S2-1812083 Local Network Exposure With LLMF, 3rd Generation Partnership Project (3GPP), Mobile Competence Centre dated Nov. 20, 2018.
WIPO, International Search Report issued on Sep. 7, 2022.
Japan Patent Office, OA1 dated Dec. 3, 2024, for corresponding JP application No. 2023-580616.

* cited by examiner

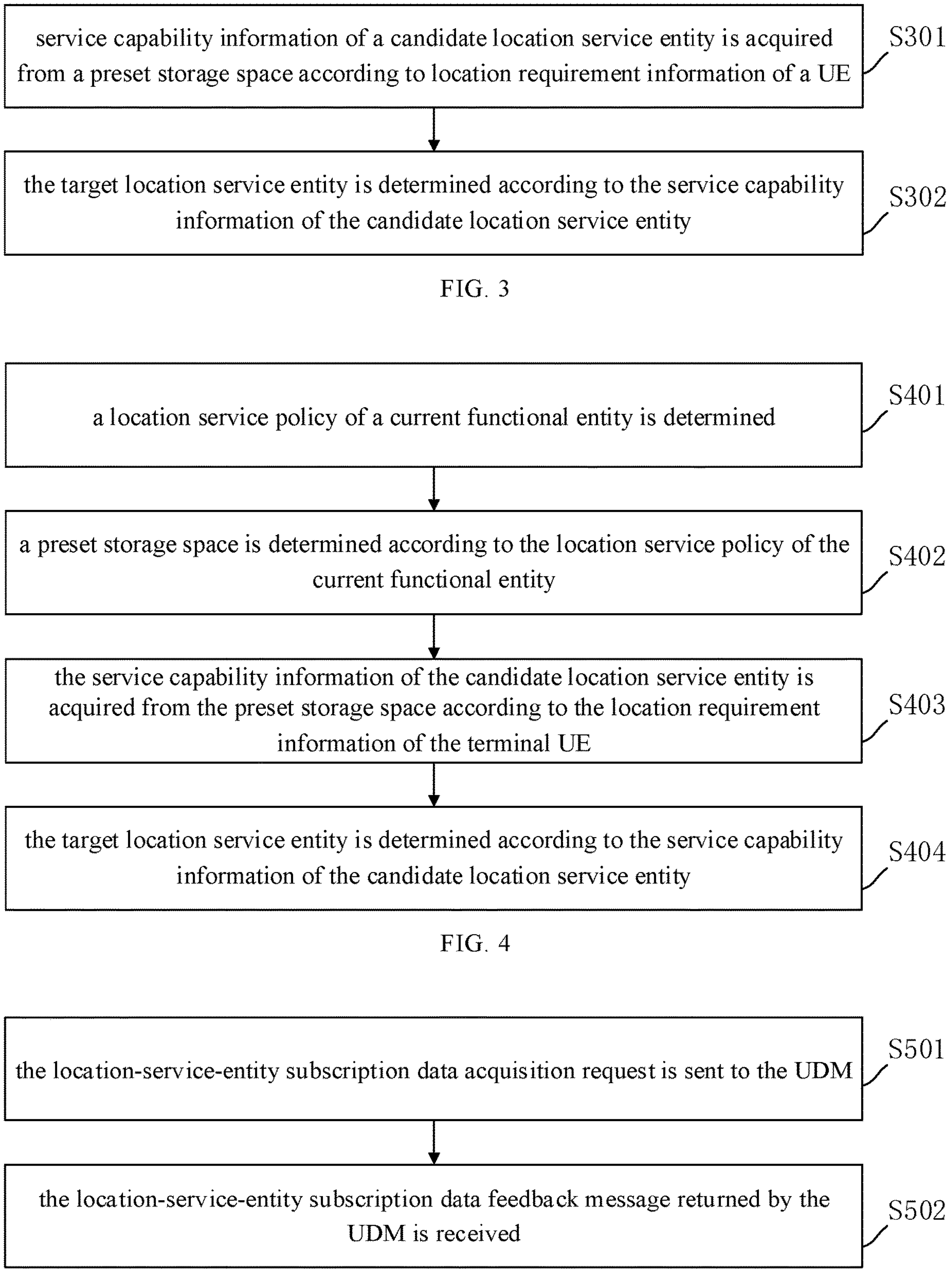
service capability information of a candidate location service entity is acquired from a preset storage space according to location requirement information of a UE
S301
the target location service entity is determined according to the service capability information of the candidate location service entity
S302
FIG. 3
a location service policy of a current functional entity is determined
S401
a preset storage space is determined according to the location service policy of the current functional entity
S402
the service capability information of the candidate location service entity is acquired from the preset storage space according to the location requirement information of the terminal UE
S403
the target location service entity is determined according to the service capability information of the candidate location service entity
S404
FIG. 4
the location-service-entity subscription data acquisition request is sent to the UDM
S501
the location-service-entity subscription data feedback message returned by the UDM is received
S502
FIG. 5

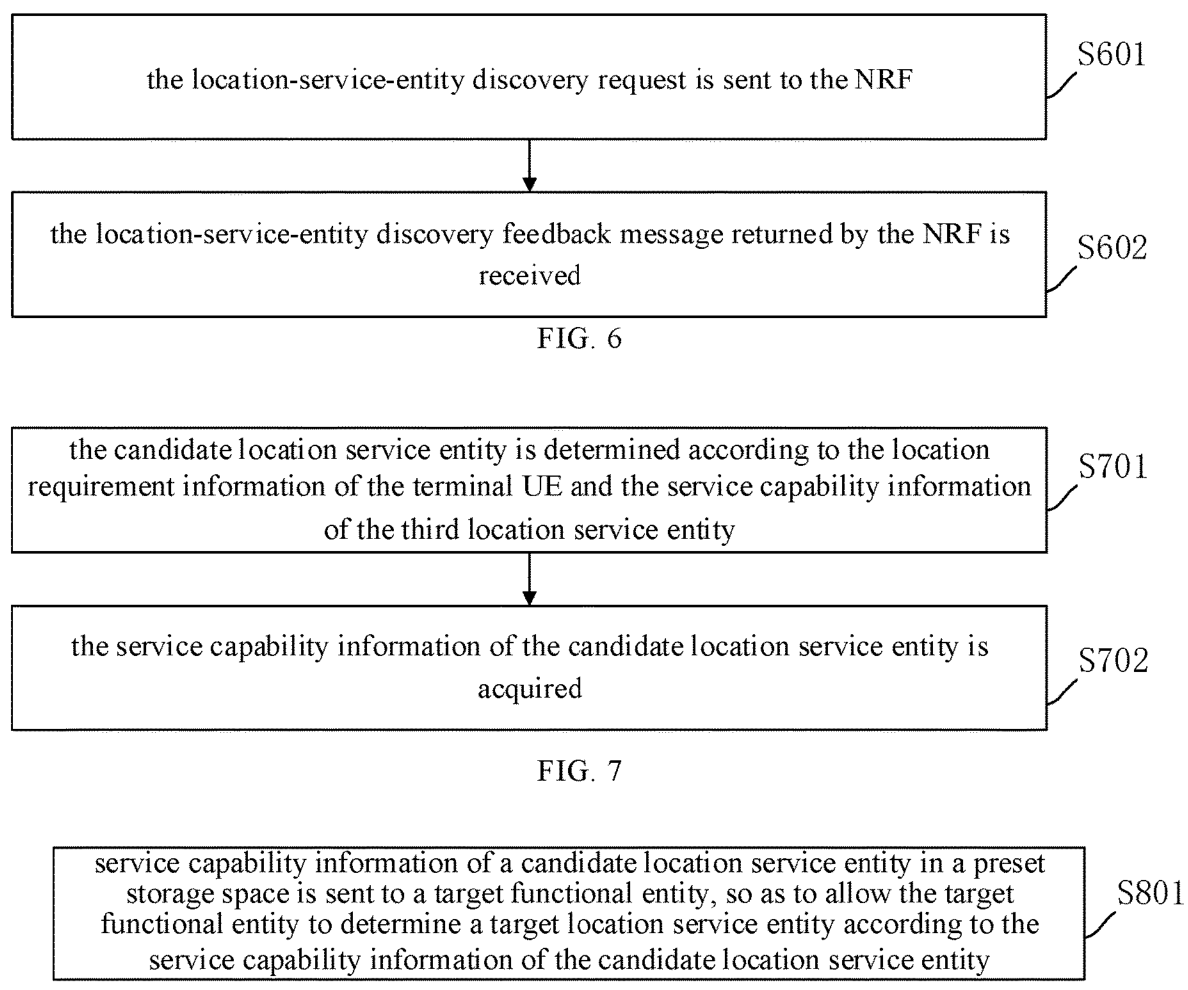
FIG. 6
FIG. 7
FIG. 8
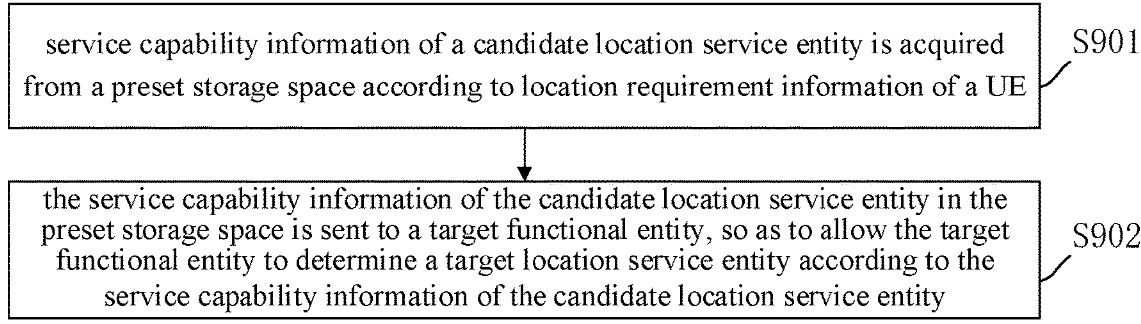
FIG. 9

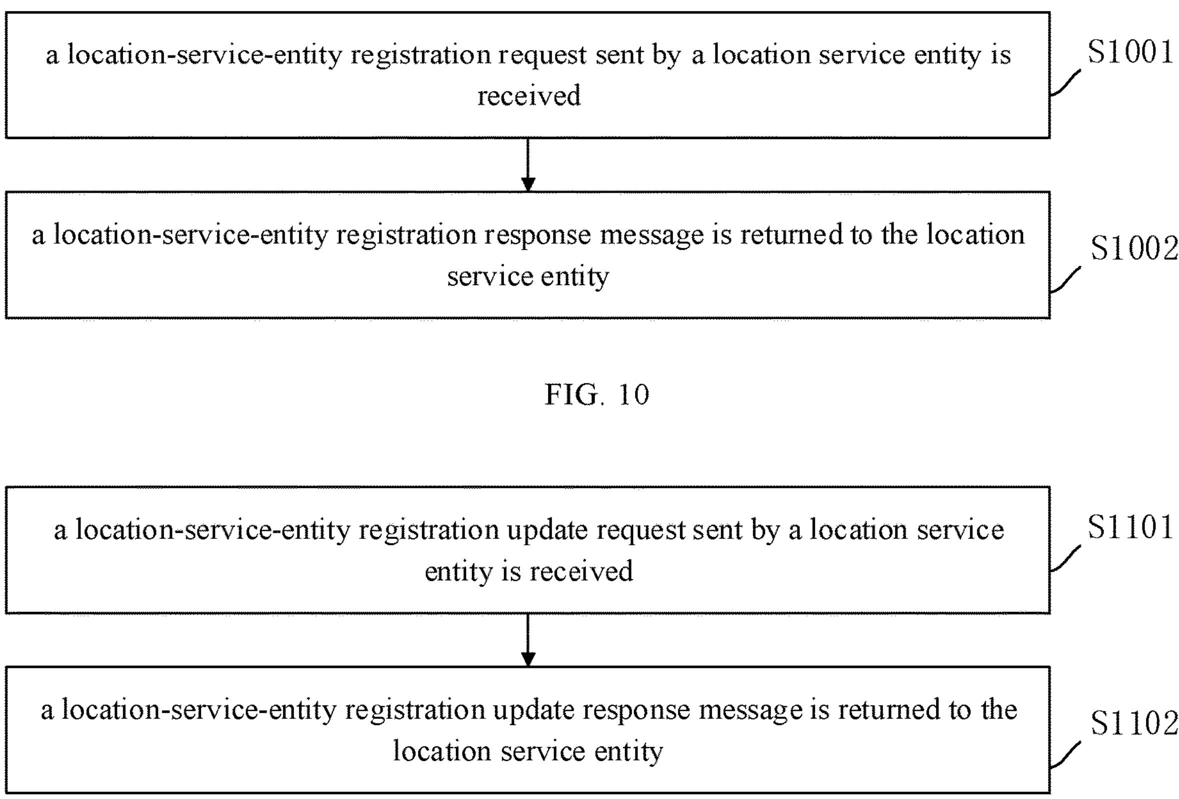
FIG. 10
FIG. 11
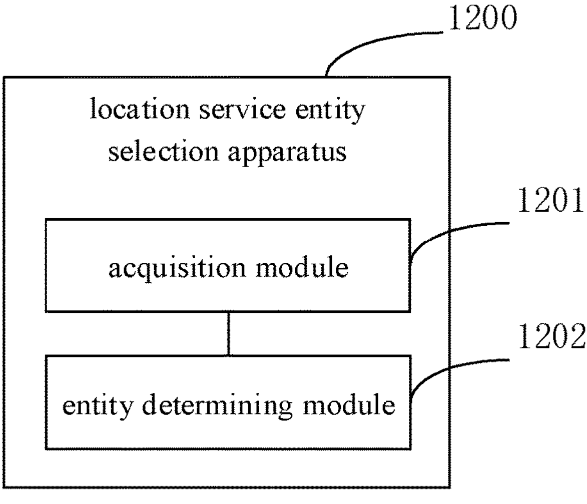
FIG. 12

LOCATION SERVICE ENTITY SELECTION METHOD AND APPARATUS, AND ELECTRONIC DEVICE AND READABLE STORAGE MEDIUM

CROSS-REFERENCE TO RELATED APPLICATIONS

The present disclosure is a National Phase Application filed under 35 U.S.C. 371 as a national stage of PCT/CN2022/101111 filed on Jun. 24, 2022, an application claiming the priority to Chinese Patent Application No. 202110737288.0 filed with the CNIPA on Jun. 30, 2021, the contents of which are incorporated herein by reference in their entirety.

TECHNICAL FIELD

The present disclosure relates to, but is not limited to, the technical field of communications.

BACKGROUND

In communication networks such as a 5G core network, a Location Management Function (LMF) entity and/or a Gateway Mobile Location Center (GMLC) entity may be generally used to determine a location of a terminal connected to the communication networks. In some cases, slice information of the terminal is typically used for selection of the LMF entity and/or the GMLC entity providing a positioning service. However, in the cases of selecting the LMF entity and/or the GMLC entity according to the slice information of the terminal, there is a problem that the selected LMF entity and/or the selected GMLC entity is/are not appropriate.

SUMMARY

The present disclosure provides a location service entity selection method and apparatus, an electronic device, and a readable storage medium.

The present disclosure provides a location service entity selection method, including: acquiring service capability information of a candidate location service entity from a preset storage space according to location requirement information of a user equipment (UE); and determining a target location service entity according to the service capability information of the candidate location service entity.

The present disclosure provides another location service entity selection method, including: sending service capability information of a candidate location service entity in a preset storage space to a target functional entity, so as to allow the target functional entity to determine a target location service entity according to the service capability information of the candidate location service entity; wherein the service capability information of the candidate location service entity is information acquired from the preset storage space according to location requirement information of a user equipment (UE).

The present disclosure provides a location service entity selection apparatus, including: an acquisition module configured to acquire service capability information of a candidate location service entity from a preset storage space according to location requirement information of a user equipment (UE); and an entity determining module configured to determine a target location service entity according to the service capability information of the candidate location service entity.

The present disclosure provides another location service entity selection apparatus, including: a sending module configured to send service capability information of a candidate location service entity in a preset storage space to a target functional entity, so as to allow the target functional entity to determine a target location service entity according to the service capability information of the candidate location service entity; wherein the service capability information of the candidate location service entity is information acquired from the preset storage space according to location requirement information of a user equipment (UE).

The present disclosure provides an electronic device, including: one or more processors; and a memory having stored thereon one or more programs which, when executed by the one or more processors, cause the one or more processors to implement any one of the location service entity selection methods described herein.

The present disclosure provides a readable storage medium having stored thereon a computer program which, when executed by a processor, implements any one of the location service entity selection methods described herein.

BRIEF DESCRIPTION OF DRAWINGS

FIG. 3 is a flowchart illustrating a location service entity selection method according to the present disclosure.

FIG. 4 is a flowchart illustrating a location service entity selection method according to the present disclosure.

FIG. 5 is a flowchart illustrating a method for acquiring service capability information of a candidate location service entity according to the present disclosure.

FIG. 6 is a flowchart illustrating another method for acquiring service capability information of a candidate location service entity according to the present disclosure.

FIG. 7 is a flowchart illustrating yet another method for acquiring service capability information of a candidate location service entity according to the present disclosure.

FIG. 8 is a flowchart illustrating a location service entity selection method according to the present disclosure.

FIG. 9 is a flowchart illustrating a location service entity selection method according to the present disclosure.

FIG. 10 is a flowchart illustrating a location-service-entity registration method according to the present disclosure.

FIG. 11 is a flowchart illustrating a location-service-entity registration updating method according to the present disclosure.

FIG. 12 is a schematic structural diagram of a location service entity selection apparatus according to the present disclosure.

DETAIL DESCRIPTION OF EMBODIMENTS

In order to make the objectives, technical solutions and advantages of the present disclosure clearer, the implementations of the present disclosure are further described in detail below in conjunction with the drawings. It should be noted that the implementations described herein and the features therein can be arbitrarily combined with one another if no conflict is incurred.

The Location Service (LCS) is a value-added service which has been attracting attention in the field of mobile communication in recent years, and the LCS is provided mainly by using a location service entity such as an LMF entity and/or a GMLC entity to acquire location information of a terminal. Moreover, other services such as a location-information-based navigation service may be derived based on the location information acquired for the location service.

In practical applications, in view of different requirements of different users on the LCS, various deploying methods such as centralized deployment, sinking deployment, and independent deployment may be adopted to deploy the LMF entity and/or the GMLC entity. However, in some cases, selection of the LMF entity and/or GMLC entity is typically based on slice information of the terminal, without considering an actual deployment situation of the LMF entity and/or GMLC entity and an access location and/or access network information of the terminal, which may produce a result that the selected LMF entity and/or the selected GMLC entity is/are not appropriate.

In view of the above, the present disclosure provides a location service entity selection method and apparatus, an electronic device, and a readable storage medium, which determine, according to service capability information of location service entities stored by a current functional entity or other functional entities, a candidate location service entity matched with location requirement information of a terminal, and further select a target location service entity from the matched candidate location service entity, so as to obtain the target location service entity better meeting a user requirement. Thus, when a positioning service is provided for the terminal based on the target location service entity, positioning service experience of a user can be effectively improved.

For a better understanding of the present disclosure, a brief introduction is first made to a communication network and functional entities thereof involved in the implementations of the present disclosure.

Figure 1:
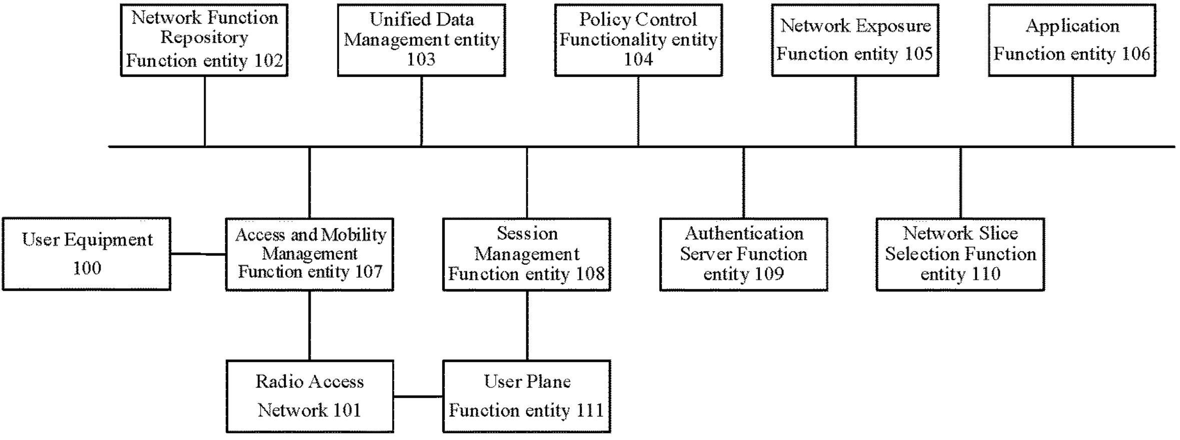
FIG. 1 is a schematic structural diagram of a network architecture of a communication system according to the present disclosure

FIG. 1 is a schematic structural diagram of a network architecture of a communication system according to the present disclosure. As shown in FIG. 1, devices and functional entities in the network architecture of the communication system include: User Equipment (UE) 100, a Radio Access Network (RAN) 101, a Network Function Repository Function (NRF) entity 102, a Unified Data Management (UDM) entity 103, a Policy Control Functionality (PCF) entity 104, a Network Exposure Function (NEF) entity 105, an Application Function (AF) entity 106, an Access and Mobility Management Function (AMF) entity 107, a Session Management Function (SMF) entity 108, an Authentication Server Function (AUSF) entity 109, a Network Slice Selection Function (NSSF) entity 110, and a User Plane Function (UPF) entity 111.

The UE 100 accesses a 5G network mainly through a wireless air interface and is provided with services. Illustratively, the UE exchanges information with a base station through the air interface, and exchanges information with an AMF entity of a core network through Non-Access Stratum (NAS) signaling.

The RAN 101 is responsible for scheduling of air interface resources of an access network of the UE and connection management of air interfaces.

The NRF entity 102 is a core-network control plane entity, and is responsible for dynamic registration of service capabilities of network functions and network function discovery.

The UDM entity 103 is a core-network control plane entity, belongs to a user server, and permanently stores user subscription data.

The PCF entity 104 is a core-network control plane entity, and is a functional entity responsible for access and mobility management policies, UE policies, session management policies, and charging rules. This functional entity generates access and mobility management policies, UE routing policies, Quality of Service (QOS) rules of user data transfer, and charging rules mainly according to service information, user subscription information, and configuration information of an operator.

The NEF entity 105 is a core-network control plane entity, and is responsible for exposure of mobile network capabilities.

The AF entity 106 is an application entity, and is responsible for providing a specific service for a user.

The AMF entity 107 is a core-network control plane entity, and is mainly responsible for user mobility management including registration and temporary identity allocation, and is also mainly responsible for maintenance of an IDLE state and a CONNECT state and transition of states, switching in the CONNECT state, and triggering of functions such as a paging function in an IDLE state of a user.

The SMF entity 108 is a core-network control plane entity, and is mainly responsible for maintaining Protocol Data Unit Sessions (PDU Sessions) and allocating Internet Protocol (IP) addresses to users, and has a QoS control function, a charging function, and a function to cache a downlink data packet received in an IDLE state of a user and inform the AMF entity to page the user.

The AUSF entity 109 is a core-network control plane entity, and is mainly responsible for authentication and authorization of users to ensure that the users are valid users.

The NSSF entity 110 is a core-network control plane entity, and is responsible for selection of a target Network Slice Instance (NSI).

The UPF entity 111 is a core-network control-plane functional entity, and is responsible for forwarding of user data packets, and also has a function to count the user data packets for charging.

Figure 2:
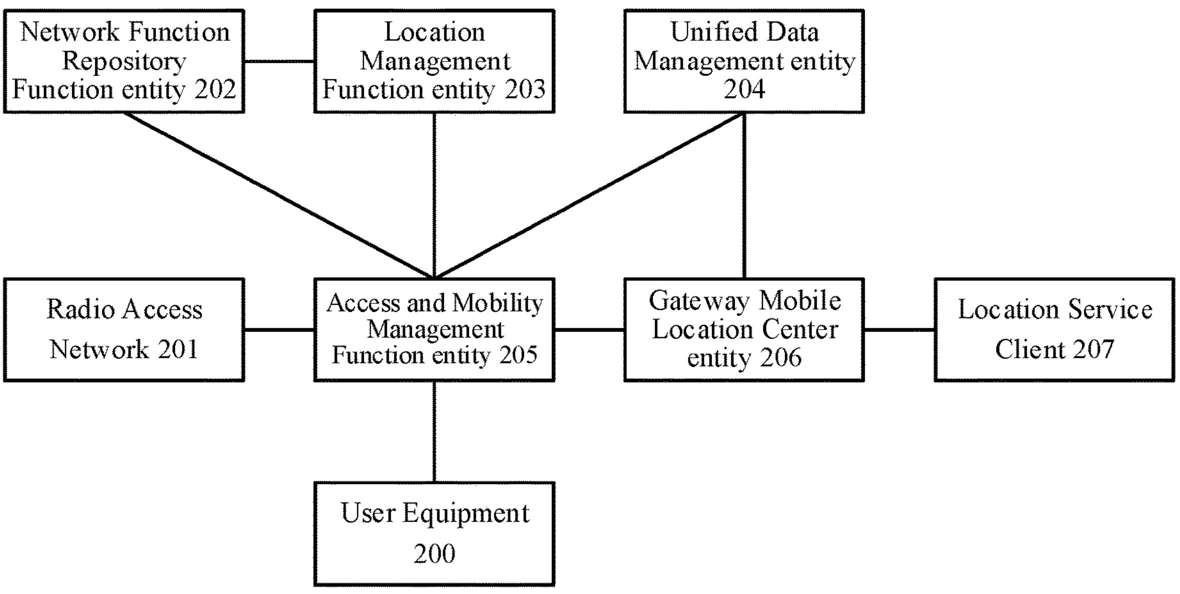
FIG. 2 is a schematic structural diagram of a location service network architecture according to the present disclosure.

FIG. 2 is a schematic structural diagram of a location service network architecture according to the present disclosure. As shown in FIG. 2, devices and functional entities in the location service network architecture include: a UE

200, an RAN 201, an NRF entity 202, an LMF entity 203, a UDM entity 204, an AMF entity 205, a GMLC entity 206, and an LCS Client 207.

The LMF entity 203 and the GMLC entity 206 are both location service entities, and are configured to provide a location service for the UE; and the LCS Client 207 is responsible for monitoring and control of user location services.

Illustratively, the LMF entity 203 is a core-network control plane entity, and is responsible for collecting, calculating and determining related location information of the UE 200. The GMLC entity 206 is a core-network control plane entity, and is responsible for interacting with the LCS Client 207 and the AMF entity 205, executing a positioning request from the LCS Client 207, and returning a positioning result to the LCS Client 207. Functions of the UE 200, the RAN 201, the NRF entity 202, the UDM entity 204, and the AMF entity 205 may be found in the related description with reference to FIG. 1, and will not be described in detail here.

It should be noted that the number of LMF entities 203 or GMLC entities 206 may be one or more. In some cases, when the AMF entity 205 has a requirement to select a location service entity and a location service entity for providing a location service is selected from a plurality of LMF entities 203 and/or a plurality of GMLC entities 206 merely based on slice information of the UE, a problem that a selected LMF entity and/or a selected GMLC is/are not appropriate may be caused due to lack of consideration of a location and access network information of the UE and information about the location service entity such as a service area and a service network of the location service entity, so that location service experience of a user may be affected. Therefore, how to select an appropriate location service entity to improve location service experience of users becomes an urgent problem to be solved.

FIG. 3 is a flowchart illustrating a location service entity selection method according to the present disclosure. The location service entity selection method may be applied to a functional entity which needs to select a location service entity or determine whether to reselect a location service entity. As shown in FIG. 3, in some implementations, the location service entity selection method may include the following operations S301 and S302.

In operation S301, service capability information of a candidate location service entity is acquired from a preset storage space according to location requirement information of a user equipment (UE).

The location requirement information of the user equipment (UE) includes access location information of the user equipment (UE) and/or access network information of the user equipment (UE). The access location information of the UE may indicate current location information of the UE. In some implementations, the access location information of the UE includes any one or more of a Tracking Area (TA) accessed by the UE, an access cell of the UE, or an access base station of the UE. For example, the access location information of the UE includes a TA currently accessed by the UE, or a TA which is last accessed by the UE and is perceivable by a current functional entity. The access network information of the UE includes information about a network accessed by the UE. In some implementations, a Closed Access Group (CAG) identifier may be used to represent the access network information of the UE. For example, the access network information of the UE includes a list of CAG identifiers supported by a current access cell of the UE or a subset of the list, or a list of CAG identifiers of CAGs which the UE is allowed to access or a subset of the list.

A location service entity includes a Location Management Function entity LMF and/or a Gateway Mobile Location Center entity GMLC, and the candidate location service entity includes one or more location service entities selected from location service entities according to the location requirement information of the UE. The service capability information of the candidate location service entity includes service area information of the candidate location service entity and/or service network information of the candidate location service entity. The service area information of the candidate location service entity is used for indicating information about an area where the candidate location service entity can provide a service. In some implementations, the service area information of the candidate location service entity includes one TA or a group of TAs, and indicates that the candidate location service entity can provide a location service in the TA or the TAs. The service network information of the candidate location service entity is used for indicating information about a network for which the candidate location service entity can provide a service. In some implementations, the service network information of the candidate location service entity includes one CAG identifier or a group of CAG identifiers, and indicates that the candidate location service entity can provide a location service for a network corresponding to the CAG identifier or the CAG identifiers.

The preset storage space includes a local storage space set in the current functional entity or a remote storage space set in a functional entity except for the current functional entity. Service capability information of the location service entities is pre-stored in the preset storage space, so as to allow the current functional entity to select the service capability information of the candidate location service entity from the preset storage space according to the location requirement information of the UE.

In some implementations, the local storage space includes a storage space (e.g., Local_NF (a local configuration function entity)) of the current functional entity for storing configuration information including the service capability information of the location service entities, and the current functional entity includes, but is not limited to, an Access and Mobility Management function entity. The remote storage space includes a storage space set in a Unified Data Management entity UDM or a storage space set in a Network Function Repository Function entity NRF.

In other words, according to the location requirement information of the UE, the current functional entity may acquire the service capability information of the candidate location service entity from the local storage space, or from the storage space preset in the UDM, or from the storage space preset in the NRF. With the preset storage space set in the current functional entity or the other functional entities, the number of acquisition channels of the current functional entity for acquiring the service capability information of the candidate location service entity is increased, so that the current functional entity can acquire the desired information from any one of the above multiple storage spaces, which guarantees successful acquisition of the service capability information of the candidate location service entity by the current functional entity.

In some implementations, in a case where the remote storage space is the storage space set in the UDM, acquiring the service capability information of the candidate location service entity from the preset storage space according to the location requirement information of the UE includes: sending a location-service-entity subscription data acquisition request, which includes the location requirement information of the UE, to the UDM; and receiving a location-service-entity subscription data feedback message returned by the UDM; and the location-service-entity subscription data feedback message includes the service capability information of the candidate location service entity, the service capability information of the candidate location service entity is information determined by the UDM according to the location requirement information of the UE and service capability information of a first location service entity, and the service capability information of the first location service entity is pre-stored in the storage space in the UDM. In other words, the candidate location service entity indicated in the location-service-entity subscription data feedback message is a location service entity determined by the UDM as being capable of meeting a location requirement of the UE.

With the location requirement information of the UE carried in the location-service-entity subscription data acquisition request, the UDM can screen out the candidate location service entity meeting the location requirement of the UE from the preset storage space, and feed the service capability information of the candidate location service entity back to the current functional entity for the current functional entity to select, based on the service capability information of the candidate location service entity, a target location service entity better meeting a user requirement, so that positioning service experience of users can be effectively improved in a case of providing a positioning service for the UE based on the target location service entity.

In some exemplary implementations, the service capability information of the first location service entity is information acquired by the UDM according to a location-service-entity subscription request sent by the UE; and the location-service-entity subscription request includes service capability information of a location service entity subscribing to the UE. By pre-storing the service capability information of the first location service entity, the UDM provides a corresponding data basis for the current functional entity to select the location service entity.

In some other implementations, in a case where the remote storage space is the storage space set in the NRF, acquiring the service capability information of the candidate location service entity from the preset storage space according to the location requirement information of the UE includes: sending a location-service-entity discovery request, which includes the location requirement information of the UE, to the NRF; and receiving a location-service-entity discovery feedback message returned by the NRF; and the location-service-entity discovery feedback message includes the service capability information of the candidate location service entity, the service capability information of the candidate location service entity is information determined by the NRF according to the location requirement information of the UE and service capability information of a second location service entity, and the service capability information of the second location service entity is pre-stored in the storage space in the NRF. In other words, the candidate location service entity indicated in the location-service-entity discovery feedback message is a location service entity determined by the NRF as being capable of meeting a location requirement of the UE.

With the location requirement information of the UE carried in the location-service-entity discovery request, the NRF can screen out the candidate location service entity meeting the location requirement of the UE from the preset storage space, and feed the service capability information of the candidate location service entity back to the current functional entity for the current functional entity to select, based on the service capability information of the candidate location service entity, a target location service entity better meeting a user requirement, so that positioning service experience of users can be effectively improved in a case of providing a positioning service for the UE based on the target location service entity.

In some exemplary implementations, the service capability information of the second location service entity is information acquired by the NRF according to a location-service-entity registration request sent by a location service entity and/or a location-service-entity registration update request sent by a location service entity; and the location-service-entity registration request and/or the location-service-entity registration update request may include service capability information of the location service entity to be registered and/or service capability information of the location service entity to be subjected to registration updating. By pre-storing the service capability information of the second location service entity, the NRF provides a corresponding data basis for the current functional entity to select the location service entity.

In some other embodiments, in a case where the preset storage space is the local storage space set in the current functional entity, acquiring the service capability information of the candidate location service entity from the preset storage space according to the location requirement information of the UE includes: determining the candidate location service entity according to the location requirement information of the UE and service capability information of a third location service entity, with the service capability information of the third location service entity pre-stored in the storage space in the current functional entity; and acquiring the service capability information of the candidate location service entity.

Determining, by the current functional entity, the candidate location service entity according to the location requirement information of the UE and the service capability information of the third location service entity includes: determining the candidate location service entity according to the access location information of the UE and service area information of the third location service entity; or, determining the candidate location service entity according to the access network information of the UE and service network information of the third location service entity; or, determining the candidate location service entity according to the access location information and the access network information of the UE and the service area information and the service network information of the third location service entity.

In other words, when the current functional entity selects the candidate location service entity based on the local storage space, the current functional entity can determine the candidate location service entity based on the network information of the UE and the network information of the location service entity, or based on the location information of the UE and the location information of the location service entity, or based on the network information and the location information of the UE and the service network information and the location information of the location service entity, so that the current functional entity can determine the candidate location service entity corresponding thereto according to different types of information. Thus, it is ensured that the current functional entity can acquire the service capability information of the candidate location service entity in a scenario involving any of the different types of information.

In operation S302, the target location service entity is determined according to the service capability information of the candidate location service entity.

The number of candidate location service entities may be one or more. In the presence of a plurality of candidate location service entities, the current functional entity needs to select one of the plurality of candidate location service entities as the target location service entity.

In some implementations, determining the target location service entity according to the service capability information of the candidate location service entity includes: determining a service capability grade of the candidate location service entity according to the service capability information of the candidate location service entity; and determining the target location service entity according to the service capability grade of the candidate location service entity. The service capability grade of the candidate location service entity is used for representing a service capability level of the candidate location service entity.

For example, the candidate location service entities include a first candidate location service entity and a second candidate location service entity, a service area of the first candidate location service entity is a first area, a service area of the second candidate location service entity is a second area, and the first area belongs to a subset of the second area (that is, the first area is a part of the second area). Based on this, it is determined that a service capability grade of the second candidate location service entity is higher than that of the first candidate location service entity, and therefore, the second candidate location service entity is selected as the target location service entity.

In this implementation, in a case where the number of the candidate location service entities is more than one, a relatively optimal location service entity may be determined according to the service capability grades of the candidate location service entities and taken as the target location service entity, which can further improve location service experience of users.

In some other implementations, the service capability information of the candidate location service entity further includes service slice information of the candidate location service entity. Determining the target location service entity according to the service capability information of the candidate location service entity includes: determining the target location service entity according to the service slice information of the candidate location service entity; and the target location service entity is the candidate location service entity matched with an access slice of the UE.

For example, the candidate location service entities include a first candidate location service entity, a second candidate location service entity, and a third candidate location service entity, service slices of the first candidate location service entity are a first slice and a second slice, a service slice of the second candidate location service entity is the first slice, and a service slice of the third candidate location service entity is a third slice. Assuming that the access slice of the UE is the third slice, based on this, the third candidate location service entity matched with the access slice of the UE is selected as the target location service entity.

It should be noted that the target location service entity may also be determined according to the service capability grade of the candidate location service entity together with the service slice information of the candidate location service entity. For example, when the number of the candidate location service entities matched with the access slice of the UE is more than one, the target location service entity may be further selected from the matched candidate location service entities according to the service capability grades of the matched candidate location service entities.

In this implementation, the service capability information of the candidate location service entity is acquired from the preset storage space according to the location requirement information of the UE, and the target location service entity is determined according to the service capability information of the candidate location service entity, with the preset storage space including the local storage space set in the current functional entity or the remote storage space set in the functional entity except for the current functional entity. The candidate location service entity matched with the location requirement information of the UE is determined based on the service capability information of the location service entities which is stored in the current functional entity or the other functional entities, and the target location service entity is further selected from the matched candidate location service entity, so that the target location service entity better meeting the user requirement can be obtained, and positioning service experience of users can be effectively improved in a case of providing a positioning service for the UE based on the target location service entity.

FIG. 4 is a flowchart illustrating a location service entity selection method according to the present disclosure. The location service entity selection method may be applied to a functional entity which needs to select a location service entity or determine whether to reselect a location service entity. As shown in FIG. 4, in some implementations, the location service entity selection method may include the following operations S401 to S404.

In operation S401, a location service policy of a current functional entity is determined.

The location service policy is a policy used by the current functional entity when selecting a location service entity.

In some implementations, the location service policy includes any one of a subscription location service policy, a remote query location service policy, or a local configuration location service policy.

In some exemplary implementations, when the current functional entity does not have an outward communication capability or an outward communication link is congested, the location service policy of the current functional entity may be set to be the local configuration location service policy, so as to allow the current functional entity to acquire service capability information of a candidate location service entity merely based on information pre-stored in a local storage space.

In some exemplary implementations, when a relatively high requirement is proposed on the precision of the location service, the acquired service capability information of the candidate location service entity needs to be more accurate. Therefore, the location service policy of the current functional entity may be set to be the remote query location service policy, so as to enable determination of the candidate location service entity based on more comprehensive and more accurate data in a remote storage space, and enable determination of a better target location service entity based on the service capability information of the candidate location service entity, thereby improving the precision of the location service.

In some exemplary implementations, when a relatively high requirement is proposed on a delay of a location service, in order to simplify data processing to reduce the delay, the location service policy of the current functional entity may be set to be the subscription location service policy, so as to enable selection of the target service entity directly according to service capability information of a location service entity subscribing to a UE.

It should be noted that the above examples of the location service policies are merely for illustration, and other location service policies that are not described herein are also within the scope of the present disclosure, and are not limited herein.

In operation S402, a preset storage space is determined according to the location service policy of the current functional entity.

When the current functional entity selects the location service entity, the current functional entity may select, based on location requirement information of the UE, the service capability information of the candidate location service entity from the local storage space, or from a storage space preset in a Unified Data Management entity UDM, or from a storage space preset in a Network Function Repository Function entity NRF, so as to further select a target location service entity according to the service capability information of the candidate location service entity. A method for acquiring the service capability information of the candidate location service entity and a preset storage space from which the service capability information of the candidate location service entity is acquired may be determined according to the location service policy set for the current functional entity.

In some implementations, determining the preset storage space according to the location service policy of the current functional entity includes: in a case where the location service policy of the current functional entity is the subscription location service policy, determining the preset storage space to be a remote storage space set in the UDM; in a case where the location service policy of the current functional entity is the remote query location service policy, determining the preset storage space to be a remote storage space set in the NRF; and in a case where the location service policy of the current functional entity is the local configuration location service policy, determining the preset storage space to be a local storage space set in the current functional entity.

By setting a corresponding relationship between the different location service policies and the preset storage spaces, the current functional entity can quickly and accurately determine the corresponding preset storage space according to the corresponding relationship after determining the location service policy.

It should be noted that the current functional entity may be configured with no location service policy, in which case the location service policy is in a default state. In such case, the current functional entity may preferentially select a location service entity according to subscription information of the UE, which ensures that the current functional entity can still select an appropriate location service entity when no location service policy is configured.

In some implementations, in a case where the location service policy of the current functional entity is in the default state, the current functional entity sends a location-service-entity subscription data acquisition request, which includes the location requirement information of the UE, to the UDM, and receives a location-service-entity subscription data feedback message returned by the UDM; and the location-service-entity subscription data feedback message includes the service capability information of the candidate location service entity, the service capability information of the candidate location service entity is information determined by the UDM according to the location requirement information of the UE and service capability information of a first location service entity, and the service capability information of the first location service entity is pre-stored in the storage space in the UDM.

In operation S403, the service capability information of the candidate location service entity is acquired from the preset storage space according to the location requirement information of the user equipment (UE).

In operation S404, the target location service entity is determined according to the service capability information of the candidate location service entity.

It should be noted that the operations S403 and S404 in this implementation are the same as the operations S301 and S302 in the aforesaid implementation, and thus will not be repeated here.

In this implementation, the location service policy of the current functional entity is first determined, the preset storage space matched with the location service policy is then determined, the service capability information of the candidate location service entity is acquired from the matched preset storage space, and the target location service entity is determined according to the service capability information of the candidate location service entity. The location service policy is preset for the current functional entity according to a location service requirement of a user or an actual application scenario, so that the service capability information of the candidate location service entity can be acquired from the corresponding preset storage space based on the location service policy, and the target location service entity can be selected based on the acquired information. Thus, the requirement of the user or requirements of application scenarios can be flexibly met, thereby effectively improving positioning service experience of users.

FIG. 5 is a flowchart illustrating a method for acquiring service capability information of a candidate location service entity according to the present disclosure. As shown in FIG. 5, in some implementations, the method for acquiring the service capability information of the candidate location service entity may include the following operations S501 and S502.

In operation S501, the location-service-entity subscription data acquisition request is sent to the UDM.

The location-service-entity subscription data acquisition request includes the location requirement information of the UE.

The location requirement information of the UE includes access location information of the UE and/or access network information of the UE. The access location information of the UE may indicate current location information of the UE. In some implementations, the access location information of the UE includes any one or more of a TA accessed by the UE, an access cell of the UE, or an access base station of the UE. For example, the access location information of the UE includes a TA currently accessed by the UE, or a TA which is last accessed by the UE and is perceivable by the current functional entity. The access network information of the UE includes information about a network accessed by the UE. In some implementations, a CAG identifier may be used to represent the access network information of the UE. For example, the access network information of the UE includes a list of CAG identifiers supported by a current access cell of the UE or a subset of the list, or a list of CAG identifiers of CAGs which the UE is allowed to access or a subset of the list.

In operation S502, the location-service-entity subscription data feedback message returned by the UDM is received.

The location-service-entity subscription data feedback message includes the service capability information of the candidate location service entity, the service capability information of the candidate location service entity is the information determined by the UDM according to the location requirement information of the UE and the service capability information of the first location service entity, and the service capability information of the first location service entity is pre-stored in the storage space in the UDM.

The service capability information of the candidate location service entity includes service area information of the candidate location service entity and/or service network information of the candidate location service entity. The service area information of the candidate location service entity is used for indicating information about an area where the candidate location service entity can provide a service. In some implementations, the service area information of the candidate location service entity includes one TA or a group of TAs, and indicates that the candidate location service entity can provide a location service in the TA or the TAs. The service network information of the candidate location service entity is used for indicating information about a network for which the candidate location service entity can provide a service. In some implementations, the service network information of the candidate location service entity includes one CAG identifier or a group of CAG identifiers, and indicates that the candidate location service entity can provide a location service for a network corresponding to the CAG identifier or the CAG identifiers.

In this implementation, the current functional entity acquires the service capability information of the candidate location service entity from the storage space preset in the UDM. For example, the acquisition of the information is realized through the location-service-entity subscription data acquisition request and the location-service-entity subscription data feedback message, so as to enable the selection of the target functional entity based on the acquired service capability information of the candidate location service entity. Thus, a matching degree of the selected location service entity can be increased, thereby improving positioning service experience of users.

FIG. 6 is a flowchart illustrating another method for acquiring service capability information of a candidate location service entity according to the present disclosure. As shown in FIG. 6, in some implementations, the method for acquiring the service capability information of the candidate location service entity may include the following operations S601 and S602.

In operation S601, the location-service-entity discovery request is sent to the NRF.

The location-service-entity discovery request includes the location requirement information of the UE.

The location requirement information of the UE includes access location information of the UE and/or access network information of the UE. The access location information of the UE may indicate current location information of the UE. In some implementations, the access location information of the UE includes any one or more of a TA accessed by the UE, an access cell of the UE, or an access base station of the UE. For example, the access location information of the UE includes a TA currently accessed by the UE, or a TA which is last accessed by the UE and is perceivable by the current functional entity. The access network information of the UE includes information about a network accessed by the UE. In some implementations, a CAG identifier may be used to represent the access network information of the UE. For example, the access network information of the UE includes a list of CAG identifiers supported by a current access cell of the UE or a subset of the list, or a list of CAG identifiers of CAGs which the UE is allowed to access or a subset of the list.

In operation S602, the location-service-entity discovery feedback message returned by the NRF is received.

The location-service-entity discovery feedback message includes the service capability information of the candidate location service entity, the service capability information of the candidate location service entity is the information determined by the NRF according to the location requirement information of the UE and the service capability information of the second location service entity, and the service capability information of the second location service entity is pre-stored in the storage space in the NRF The service capability information of the candidate location service entity includes service area information of the candidate location service entity and/or service network information of the candidate location service entity. The service area information of the candidate location service entity is used for indicating information about an area where the candidate location service entity can provide a service. In some implementations, the service area information of the candidate location service entity includes one TA or a group of TAs, and indicates that the candidate location service entity can provide a location service in the TA or the TAs. The service network information of the candidate location service entity is used for indicating information about a network for which the candidate location service entity can provide a service. In some implementations, the service network information of the candidate location service entity includes one CAG identifier or a group of CAG identifiers, and indicates that the candidate location service entity can provide a location service for a network corresponding to the CAG identifier or the CAG identifiers.

In this implementation, the current functional entity acquires the service capability information of the candidate location service entity from the storage space preset in the NRF. For example, the acquisition of the information is realized through the location-service-entity discovery request and the location-service-entity discovery feedback message, so as to enable the selection of the target functional entity based on the acquired service capability information of the candidate location service entity. Thus, a matching degree of the selected location service entity can be increased, thereby improving positioning service experience of users.

FIG. 7 is a flowchart illustrating yet another method for acquiring service capability information of a candidate location service entity according to the present disclosure. As shown in FIG. 7, in some implementations, the method for acquiring the service capability information of the candidate location service entity may include the following operations S701 and S702.

In operation S701, the candidate location service entity is determined according to the location requirement information of the user equipment (UE) and the service capability information of the third location service entity.

The location requirement information of the UE includes access location information of the UE and/or access network information of the UE. The access location information of the UE may indicate current location information of the UE. In some implementations, the access location information of the UE includes any one or more of a TA accessed by the UE, an access cell of the UE, or an access base station of the UE. For example, the access location information of the UE includes a TA currently accessed by the UE, or a TA which is last accessed by the UE and is perceivable by the current functional entity. The access network information of the UE includes information about a network accessed by the UE. In some implementations, a CAG identifier may be used to represent the access network information of the UE. For example, the access network information of the UE includes a list of CAG identifiers supported by a current access cell of the UE or a subset of the list, or a list of CAG identifiers of CAGs which the UE is allowed to access or a subset of the list.

The service capability information of the third location service entity is pre-stored in the storage space in the current functional entity. In some implementations, the service capability information of the third location service entity may be configuration information of the current functional entity, and is configured to allow the current functional entity to select, when failing to acquire the service capability information of the candidate location service entity from the other functional entities, the candidate location service entity based on the local configuration information, so as to further determine the target location service entity.

In some implementations, determining the candidate location service entity according to the location requirement information of the UE and the service capability information of the third location service entity includes: determining the candidate location service entity according to the access location information of the UE and the service area information of the third location service entity; or, determining the candidate location service entity according to the access network information of the UE and the service network information of the third location service entity; or, determining the candidate location service entity according to the access location information and the access network information of the UE and the service area information and the service network information of the third location service entity.

In operation S702, the service capability information of the candidate location service entity is acquired.

The service capability information of the candidate location service entity includes service area information of the candidate location service entity and/or service network information of the candidate location service entity. The service area information of the candidate location service entity is used for indicating information about an area where the candidate location service entity can provide a service. In some implementations, the service area information of the candidate location service entity includes one TA or a group of TAs, and indicates that the candidate location service entity can provide a location service in the TA or the TAs. The service network information of the candidate location service entity is used for indicating information about a network for which the candidate location service entity can provide a service. In some implementations, the service network information of the candidate location service entity includes one CAG identifier or a group of CAG identifiers, and indicates that the candidate location service entity can provide a location service for a network corresponding to the CAG identifier or the CAG identifiers.

In this implementation, the current functional entity can acquire the service capability information of the candidate location service entity from the local storage space, so as to select the target functional entity based on the acquired service capability information of the candidate location service entity. Thus, the acquisition of the service capability information of the candidate location service entity does not rely on a communication capability of the current functional entity; and meanwhile, a matching degree of the selected location service entity can be increased, thereby improving positioning service experience of users.

FIG. 8 is a flowchart illustrating a location service entity selection method according to the present disclosure. The location service entity selection method may be applied to a functional entity provided with a preset storage space. As shown in FIG. 8, in some implementations, the location service entity selection method may include the following operation S801.

In operation S801, service capability information of a candidate location service entity in a preset storage space is sent to a target functional entity, so as to allow the target functional entity to determine a target location service entity according to the service capability information of the candidate location service entity.

The service capability information of the candidate location service entity is information acquired from the preset storage space according to location requirement information of a UE.

The location requirement information of the UE includes access location information of the UE and/or access network information of the UE. The access location information of the UE may indicate current location information of the UE. In some implementations, the access location information of the UE includes any one or more of a TA accessed by the UE, an access cell of the UE, or an access base station of the UE. For example, the access location information of the UE includes a TA currently accessed by the UE, or a TA which is last accessed by the UE and is perceivable by a current functional entity. The access network information of the UE includes information about a network accessed by the UE. In some implementations, a CAG identifier may be used to represent the access network information of the UE. For example, the access network information of the UE includes a list of CAG identifiers supported by a current access cell of the UE or a subset of the list, or a list of CAG identifiers of CAGs which the UE is allowed to access or a subset of the list.

A location service entity includes a Location Management Function entity LMF and/or a Gateway Mobile Location Center entity GMLC, and the candidate location service entity includes one or more location service entities selected from location service entities according to the location requirement information of the UE. The service capability information of the candidate location service entity includes service area information of the candidate location service entity and/or service network information of the candidate location service entity. The service area information of the candidate location service entity is used for indicating information about an area where the candidate location service entity can provide a service. In some implementations, the service area information of the candidate location service entity includes one TA or a group of TAs, and indicates that the candidate location service entity can provide a location service in the TA or the TAs. The service network information of the candidate location service entity is used for indicating information about a network for which the candidate location service entity can provide a service. In some implementations, the service network information of the candidate location service entity includes one CAG identifier or a group of CAG identifiers, and indicates that the candidate location service entity can provide a location service for a network corresponding to the CAG identifier or the CAG identifiers.

In some implementations, the current functional entity includes a Unified Data Management entity UDM or a Network Function Repository Function entity NRF. Correspondingly, the preset storage space includes a storage space set in the UDM or a storage space set in the NRF.

In a case where the current functional entity is the UDM, sending the service capability information of the candidate location service entity in the preset storage space to the target functional entity includes: in response to a location-service-entity subscription data acquisition request sent by the target functional entity, returning a location-service-entity subscription data feedback message to the target functional entity, so as to allow the target functional entity to acquire the service capability information of the candidate location service entity according to the location-service-entity subscription data feedback message and determine the target location service entity according to the service capability information of the candidate location service entity; and the location-service-entity subscription data acquisition request includes the location requirement information of the UE, and the location-service-entity subscription data feedback message includes the service capability information of the candidate location service entity. In other words, the candidate location service entity indicated in the location-service-entity subscription data feedback message is a location service entity determined by the UDM as being capable of meeting a location requirement of the UE.

In a case where the current functional entity is the NRF, sending the service capability information of the candidate location service entity in the preset storage space to the target functional entity includes: in response to a location-service-entity discovery request sent by the target functional entity, returning a location-service-entity discovery feedback message to the target functional entity, so as to allow the target functional entity to acquire the service capability information of the candidate location service entity according to the location-service-entity discovery feedback message and determine the target location service entity according to the service capability information of the candidate location service entity; and the location-service-entity discovery request includes the location requirement information of the UE, and the location-service-entity discovery feedback message includes the service capability information of the candidate location service entity. In other words, the candidate location service entity indicated in the location-service-entity discovery feedback message is a location service entity determined by the NRF as being capable of meeting a location requirement of the UE.

In this implementation, the service capability information of the candidate location service entity in the preset storage space is sent to the target functional entity, so as to allow the target functional entity to determine the target location service entity according to the service capability information of the candidate location service entity. Thus, a functional entity having a location service requirement can determine, according to the service capability information of the location service entity in the preset storage space, the candidate location service entity matched with the location requirement information of the UE, and can further select the target location service entity from the matched candidate location service entity, so that the target location service entity better meeting a user requirement can be obtained, and positioning service experience of users can be effectively improved in a case of providing a positioning service for the UE based on the target location service entity.

FIG. 9 is a flowchart illustrating a location service entity selection method according to the present disclosure. The location service entity selection method may be applied to a functional entity provided with a preset storage space. As shown in FIG. 9, in some implementations, the location service entity selection method may include the following operations S901 and S902.

In operation S901, service capability information of a candidate location service entity is acquired from a preset storage space according to location requirement information of a user equipment (UE).

Service capability information of a plurality of location service entities is pre-stored in the preset storage space. According to the location requirement information of the UE, a location service entity incapable of meeting a location requirement of the UE is first excluded, so that a location service entity capable of meeting the location requirement of the UE can be screened out, and can be taken as the candidate location service entity. Thus, a range within which other functional entities (the functional entities which need to select a location service entity or determine whether to reselect a location service entity) may select the target location service entity can be reduced, and difficulty of the other functional entities in selecting the target location service entity can be reduced.

In some implementations, in a case where a current functional entity is a Unified Data Management entity UDM, acquiring the service capability information of the candidate location service entity from the preset storage space according to the location requirement information of the UE includes: determining the candidate location service entity according to access location information of the UE and service area information of a first location service entity; or, determining the candidate location service entity according to access network information of the UE and service network information of the first location service entity; or, determining the candidate location service entity according to the access location information and the access network information of the UE and the service area information and the service network information of the first location service entity. Service capability information of the first location service entity is stored in a storage space in the UDM.

It should be noted that, in this implementation, when the UDM determines the candidate location service entity, the UDM may determine the candidate location service entity according to the network information of the UE and the network information of the location service entity, or based on the location information of the UE and the location information of the location service entity, or based on the network information and the location information of the UE and the service network information and the location information of the location service entity, so that the UDM can determine the candidate location service entity corresponding thereto according to different types of information. Thus, it is ensured that the UDM can acquire the service capability information of the candidate location service entity in a scenario involving any of the different types of information.

In some exemplary implementations, before the operation S901, the method further includes: receiving, by the UDM, a location-service-entity subscription request sent by the UE, with the location-service-entity subscription request including service capability information of a location service entity subscribing to the UE; and returning a location-service-entity subscription feedback message to the UE. Moreover, the UDM acquires the service capability information of the first location service entity according to the location-service-entity subscription request, and stores the service capability information of the first location service entity in the preset storage space; and the first location service entity is the location service entity subscribing to the UE.

It should be noted that the UDM pre-stores the service capability information of the first location service entity, thereby providing a corresponding data basis for other functional entities to select a location service entity.

In some other implementations, in a case where the current functional entity is a Network Function Repository Function entity NRF, acquiring the service capability information of the candidate location service entity from the preset storage space according to the location requirement information of the UE includes: determining the candidate location service entity according to access location information of the UE and service area information of a second location service entity; or, determining the candidate location service entity according to access network information of the UE and service network information of the second location service entity; or, determining the candidate location service entity according to the access location information and the access network information of the UE and the service area information and the service network information of the second location service entity. Service capability information of the second location service entity is stored in a storage space in the NRF.

It should be noted that, in this implementation, when the NRF determines the candidate location service entity, the NRF may determine the candidate location service entity according to the network information of the UE and the network information of the location service entity, or based on the location information of the UE and the location information of the location service entity, or based on the network information and the location information of the UE and the network information and the location information of the location service entity, so that the NRF can determine the candidate location service entity corresponding thereto according to different types of information. Thus, it is ensured that the NRF can acquire the service capability information of the candidate location service entity in a scenario involving any of the different types of information.

In some exemplary implementations, before the operation S901, the method further includes: receiving, by the NRF, a location-service-entity registration request sent by a location service entity and/or a location-service-entity registration update request sent by a location service entity, with the location-service-entity registration request and/or the location-service-entity registration update request including service capability information of the location service entity to be registered and/or service capability information of the location service entity to be subjected to registration updating; and returning a location-service-entity registration response message and/or a location-service-entity registration update response message to the location service entity. Moreover, the NRF acquires the service capability information of the second location service entity according to the location-service-entity registration request and/or the location-service-entity registration update request, and stores the service capability information of the second location service entity in the preset storage space; and the second location service entity is the location service entity to be registered and/or the location service entity to be subjected to registration updating.

It should be noted that the NRF pre-stores the service capability information of the second location service entity, thereby providing a corresponding data basis for other functional entities to select a location service entity.

In operation S902, the service capability information of the candidate location service entity in the preset storage space is sent to a target functional entity, so as to allow the target functional entity to determine a target location service entity according to the service capability information of the candidate location service entity.

It should be noted that the operation S902 in this implementation is the same as the operation S801 in the aforesaid implementation, and thus will not be repeated here.

FIG. 10 is a flowchart illustrating a location-service-entity registration method according to the present disclosure. The location-service-entity registration method may be applied to the NRF. As shown in FIG. 10, in some implementations, the location-service-entity registration method may include the following operations S1001 and S1002.

In operation S1001, a location-service-entity registration request sent by a location service entity is received.

The location-service-entity registration request includes service capability information of the location service entity to be registered.

In some implementations, service capability information of the location service entity includes service area information of the location service entity and/or service network information of the location service entity. The service area information of the location service entity is used for indicating information about an area where the location service entity can provide a service. In some implementations, the service area information of the location service entity includes one TA or a group of TAs, and indicates that the location service entity can provide a location service in the TA or the TAs. The service network information of the location service entity is used for indicating information about a network for which the location service entity can provide a service. In some implementations, the service network information of the location service entity includes one CAG identifier or a group of CAG identifiers, and indicates that the location service entity can provide a location service for a network corresponding to the CAG identifier or the CAG identifiers.

In operation S1002, a location-service-entity registration response message is returned to the location service entity.

It should be noted that, when the location service entity is registered with the NRF, the location-service-entity registration request does not carry the service capability information of the location service entity to be registered in some cases, so that the NRF cannot provide the service capability information of the candidate location service entity for other functional entities (e.g., an AMF entity).

In some implementations, after the operation S1002, the method further includes: acquiring the service capability information of the second location service entity according to the location-service-entity registration request; and the service capability information of the second location service entity is stored in the storage space in the NRF.

In other words, after receiving the location-service-entity registration request, the NRF stores the service capability information of the location service entity to be registered which is carried in the location-service-entity registration request in the local storage space, so as to provide the service capability information of the candidate location service entity for the other functional entities (e.g., the AMF entity). Thus, the other functional entities can obtain a target location service entity better meeting a user requirement according to the service capability information of the candidate location service entity, thereby effectively improving positioning service experience of users in a case of providing a positioning service for the UE based on the target location service entity.

FIG. 11 is a flowchart illustrating a location-service-entity registration updating method according to the present disclosure. The location-service-entity registration updating method may be applied to the NRF. As shown in FIG. 11, the location-service-entity registration updating method may include the following operations S1101 and S1102.

In operation S1101, a location-service-entity registration update request sent by a location service entity is received.

The location-service-entity registration update request includes service capability information of the location service entity to be subjected to registration updating.

In some implementations, the service capability information of the location service entity includes service area information of the location service entity and/or service network information of the location service entity. The service area information of the location service entity is used for indicating information about an area where the location service entity can provide a service. In some implementations, the service area information of the location service entity includes one TA or a group of TAs, and indicates that the location service entity can provide a location service in the TA or the TAs. The service network information of the location service entity is used for indicating information about a network for which the location service entity can provide a service. In some implementations, the service network information of the location service entity includes one CAG identifier or a group of CAG identifiers, and indicates that the location service entity can provide a location service for a network corresponding to the CAG identifier or the CAG identifiers.

In some implementations, if service capability information of a registered location service entity is changed, the registered location service entity sends a location-service-entity registration update request to the NRF, and carries the updated service capability information of the registered location service entity in the location-service-entity registration update request.

In operation S1102, a location-service-entity registration update response message is returned to the location service entity.

In some implementations, after the operation S1102, the method further includes: acquiring the service capability information of the second location service entity according to the location-service-entity registration update request; and the service capability information of the second location service entity is stored in the storage space in the NRF.

In other words, after receiving the location-service-entity registration update request, the NRF is aware of the change of the service capability information of the registered location service entity, and stores the updated service capability information carried in the location-service-entity registration update request in the local storage space to overwrite the original service capability information, so as to obtain the latest and accurate service capability information corresponding to the location service entity.

It should be noted that, if there is no service area information of the location service entity in the location-service-entity registration request and/or the location-service-entity registration update request sent by the location service entity to the NRF, it is indicated that the location service entity has no limit of a service area, in other words, the location service entity can provide a location service for UEs in all areas. If there is no service network information of the location service entity in the location-service-entity registration request and/or the location-service-entity registration update request sent by the location service entity to the NRF, it is indicated that the location service entity has no limit of a service network, in other words, the location service entity can provide a location service for access UEs of all networks.

FIG. 12 is a schematic structural diagram of a location service entity selection apparatus according to the present disclosure. The location service entity selection apparatus may be provided in a functional entity which needs to select a location service entity or determine whether to reselect a location service entity. As shown in FIG. 12, a location service entity selection apparatus 1200 may include an acquisition module 1201 and an entity determining module 1202.

The acquisition module 1201 is configured to acquire service capability information of a candidate location service entity from a preset storage space according to location requirement information of a user equipment (UE).

The location requirement information of the UE includes access location information of the UE and/or access network information of the UE. The access location information of the UE may indicate current location information of the UE. In some implementations, the access location information of the UE includes any one or more of a TA accessed by the UE, an access cell of the UE, or an access base station of the UE. For example, the access location information of the UE includes a TA currently accessed by the UE, or a TA which is last accessed by the UE and is perceivable by a current functional entity. The access network information of the UE includes information about a network accessed by the UE. In some implementations, a CAG identifier may be used to represent the access network information of the UE. For example, the access network information of the UE includes a list of CAG identifiers supported by a current access cell of the UE or a subset of the list, or a list of CAG identifiers of CAGs which the UE is allowed to access or a subset of the list.

A location service entity includes a Location Management Function entity LMF and/or a Gateway Mobile Location Center entity GMLC, and the candidate location service entity includes one or more location service entities selected from location service entities according to the location requirement information of the UE. The service capability information of the candidate location service entity includes service area information of the candidate location service entity and/or service network information of the candidate location service entity. The service area information of the candidate location service entity is used for indicating information about an area where the candidate location service entity can provide a service. In some implementations, the service area information of the candidate location service entity includes one TA or a group of TAs, and indicates that the candidate location service entity can provide a location service in the TA or the TAs. The service network information of the candidate location service entity is used for indicating information about a network for which the candidate location service entity can provide a service. In some implementations, the service network information of the candidate location service entity includes one CAG identifier or a group of CAG identifiers, and indicates that the candidate location service entity can provide a location service for a network corresponding to the CAG identifier or the CAG identifiers.

The preset storage space includes a local storage space set in the current functional entity or a remote storage space set in a functional entity except for the current functional entity.

Service capability information of the location service entities is pre-stored in the preset storage space, so as to allow the current functional entity to select the service capability information of the candidate location service entity from the preset storage space according to the location requirement information of the UE.

In some implementations, the local storage space includes a storage space of the current functional entity for storing configuration information including the service capability information of the location service entities, and the current functional entity includes, but is not limited to, an Access and Mobility Management function entity. The remote storage space includes a storage space set in a Unified Data Management entity UDM or a storage space set in a Network Function Repository Function entity NRF.

In other words, according to the location requirement information of the UE, the acquisition module 1201 may acquire the service capability information of the candidate location service entity from the local storage space, or from the storage space preset in the UDM, or from the storage space preset in the NRF.

In some implementations, in a case where the remote storage space is the storage space set in the UDM, the acquisition module 1201 includes a first sending unit and a first receiving unit. The first sending unit is configured to send a location-service-entity subscription data acquisition request to the UDM, and the location-service-entity subscription data acquisition request includes the location requirement information of the UE; and the first receiving unit is configured to receive a location-service-entity subscription data feedback message returned by the UDM, the location-service-entity subscription data feedback message includes the service capability information of the candidate location service entity, the service capability information of the candidate location service entity is information determined by the UDM according to the location requirement information of the UE and service capability information of a first location service entity, and the service capability information of the first location service entity is pre-stored in the storage space in the UDM. In other words, the candidate location service entity indicated in the location-service-entity subscription data feedback message is a location service entity determined by the UDM as being capable of meeting a location requirement of the UE.

In some exemplary implementations, the service capability information of the first location service entity is information acquired by the UDM according to a location-service-entity subscription request sent by the UE; and the location-service-entity subscription request includes service capability information of a location service entity subscribing to the UE.

In some other implementations, in a case where the remote storage space is the storage space set in the NRF, the acquisition module 1201 includes a second sending unit and a second receiving unit. The second sending unit is configured to send a location-service-entity discovery request to the NRF, and the location-service-entity discovery request includes the location requirement information of the UE; and the second receiving unit is configured to receive a location-service-entity discovery feedback message returned by the NRF, the location-service-entity discovery feedback message includes the service capability information of the candidate location service entity, the service capability information of the candidate location service entity is information determined by the NRF according to the location requirement information of the UE and service capability information of a second location service entity, and the service capability information of the second location service entity is pre-stored in the storage space in the NRF. In other words, the candidate location service entity indicated in the location-service-entity discovery feedback message is a location service entity determined by the NRF as being capable of meeting a location requirement of the UE.

In some exemplary implementations, the service capability information of the second location service entity is information acquired by the NRF according to a location-service-entity registration request sent by a location service entity and/or a location-service-entity registration update request sent by a location service entity; and the location-service-entity registration request and/or the location-service-entity registration update request may include service capability information of the location service entity to be registered and/or service capability information of the location service entity to be subjected to registration updating.

In some other implementations, in a case where the preset storage space is the local storage space set in the current functional entity, according to the location requirement information of the UE, the acquisition module 1201 includes a selection unit and an acquisition unit. The selection unit is configured to determine the candidate location service entity according to the location requirement information of the UE and service capability information of a third location service entity, and the service capability information of the third location service entity is pre-stored in the storage space in the current functional entity; and the acquisition unit is configured to acquire the service capability information of the candidate location service entity.

Determining, by the selection unit, the candidate location service entity according to the location requirement information of the UE and the service capability information of the third location service entity includes: determining the candidate location service entity according to the access location information of the UE and service area information of the third location service entity; or, determining the candidate location service entity according to the access network information of the UE and service network information of the third location service entity; or, determining the candidate location service entity according to the access location information and the access network information of the UE and the service area information and the service network information of the third location service entity.

The entity determining module 1202 is configured to determine a target location service entity according to the service capability information of the candidate location service entity.

The number of candidate location service entities may be one or more. In the presence of a plurality of candidate location service entities, the current functional entity needs to select one of the plurality of candidate location service entities as the target location service entity.

In some implementations, the entity determining module 1202 includes a grade determining unit and a target-entity determining unit. The grade determining unit is configured to determine a service capability grade of the candidate location service entity according to the service capability information of the candidate location service entity; and the target-entity determining unit is configured to determine the target location service entity according to the service capability grade of the candidate location service entity. The service capability grade of the candidate location service entity is used for representing a service capability level of the candidate location service entity.

In some other implementations, the service capability information of the candidate location service entity further includes service slice information of the candidate location service entity. Determining, by the entity determining module 1202, the target location service entity according to the service capability information of the candidate location service entity includes: determining the target location service entity according to the service slice information of the candidate location service entity; and the target location service entity is the candidate location service entity matched with an access slice of the UE.

It should be noted that the entity determining module 1202 may also determine the target location service entity according to the service capability grade of the candidate location service entity together with the service slice information of the candidate location service entity. For example, when the number of the candidate location service entities matched with the access slice of the UE is more than one, the target location service entity may be further selected from the matched candidate location service entities according to the service capability grades of the matched candidate location service entities.

In this implementation, the acquisition module acquires the service capability information of the candidate location service entity from the preset storage space according to the location requirement information of the UE, and the entity determining module determines the target location service entity according to the service capability information of the candidate location service entity, with the preset storage space including the local storage space set in the current functional entity or the remote storage space set in the functional entity except for the current functional entity. The candidate location service entity matched with the location requirement information of the UE is determined based on the service capability information of the location service entities which is stored in the current functional entity or the other functional entities, and the target location service entity is further selected from the matched candidate location service entity, so that the target location service entity better meeting a user requirement can be obtained, and positioning service experience of users can be effectively improved in a case of providing a positioning service for the UE based on the target location service entity.

Figure 13:
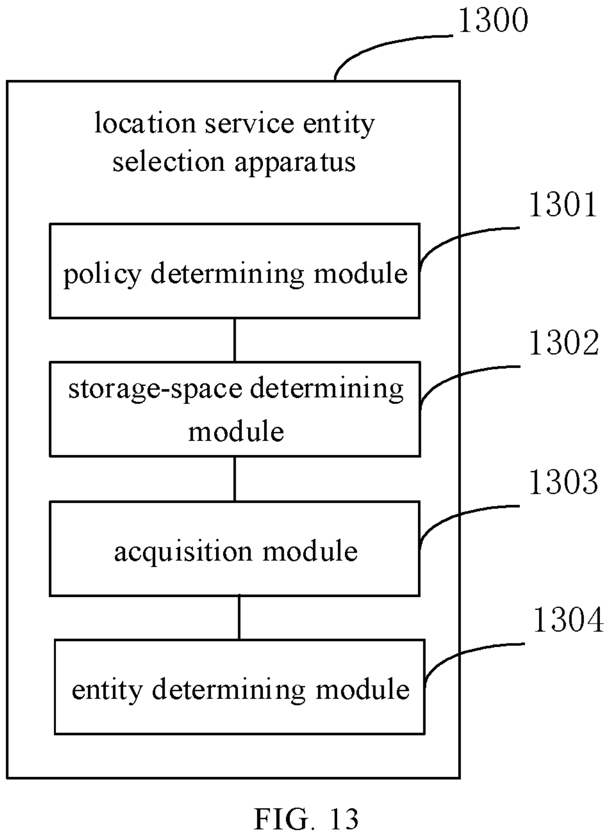
FIG. 13 is a schematic structural diagram of a location service entity selection apparatus according to the present disclosure.

FIG. 13 is a schematic structural diagram of a location service entity selection apparatus according to the present disclosure. The location service entity selection apparatus may be provided in a functional entity which needs to select a location service entity or determine whether to reselect a location service entity. As shown in FIG. 13, a location service entity selection apparatus 1300 may include a policy determining module 1301, a storage-space determining module 1302, an acquisition module 1303, and an entity determining module 1304.

The policy determining module 1301 is configured to determine a location service policy of a current functional entity.

The location service policy is a policy used by the current functional entity when selecting a location service entity.

In some implementations, the location service policy includes any one of a subscription location service policy, a remote query location service policy, or a local configuration location service policy. The location service policy of the current functional entity may be determined by the policy determining module 1301.

It should be noted that the above examples of the location service policies are merely for illustration, and other location service policies that are not described herein are also within the scope of the present disclosure, and are not limited herein.

The storage-space determining module 1302 is configured to determine a preset storage space according to the location service policy of the current functional entity.

In some implementations, determining, by the storage-space determining module 1302, the preset storage space according to the location service policy of the current functional entity includes: in a case where the location service policy of the current functional entity is the subscription location service policy, determining the preset storage space to be a remote storage space set in a Unified Data Management entity UDM; in a case where the location service policy of the current functional entity is the remote query location service policy, determining the preset storage space to be a remote storage space set in a Network Function Repository Function entity NRF; and in a case where the location service policy of the current functional entity is the local configuration location service policy, determining the preset storage space to be a local storage space set in the current functional entity.

It should be noted that the current functional entity may be configured with no location service policy, in which case the location service policy is in a default state. In such case, the current functional entity may preferentially select a location service entity according to subscription information of a UE.

In some implementations, in a case where the location service policy of the current functional entity is in the default state, the current functional entity sends a location-service-entity subscription data acquisition request, which includes location requirement information of the UE, to the UDM, and receives a location-service-entity subscription data feedback message returned by the UDM; and the location-service-entity subscription data feedback message includes service capability information of a candidate location service entity, the service capability information of the candidate location service entity is information determined by the UDM according to the location requirement information of the UE and service capability information of a first location service entity, and the service capability information of the first location service entity is pre-stored in the storage space in the UDM.

The acquisition module 1303 is configured to acquire the service capability information of the candidate location service entity from the preset storage space according to the location requirement information of the user equipment (UE).

The entity determining module 1304 is configured to determine a target location service entity according to the service capability information of the candidate location service entity.

It should be noted that the acquisition module 1303 and the entity determining module 1304 in this implementation are the same as the acquisition module 1201 and the entity determining module 1202 in the aforesaid implementation, and thus will not be repeated here.

In this implementation, the policy determining module first determines the location service policy of the current functional entity, then the storage-space determining module determines the preset storage space matched with the location service policy, the acquisition module acquires the service capability information of the candidate location service entity from the matched preset storage space, and the entity determining module determines the target location service entity according to the service capability information of the candidate location service entity. The location service policy is preset for the current functional entity according to a location service requirement of a user or an actual application scenario, so that the service capability information of the candidate location service entity can be acquired from the corresponding preset storage space based on the location service policy, and the target location service entity can be selected based on the acquired information. Thus, the requirement of the user or requirements of application scenarios can be flexibly met, thereby effectively improving positioning service experience of users.

Figure 14:
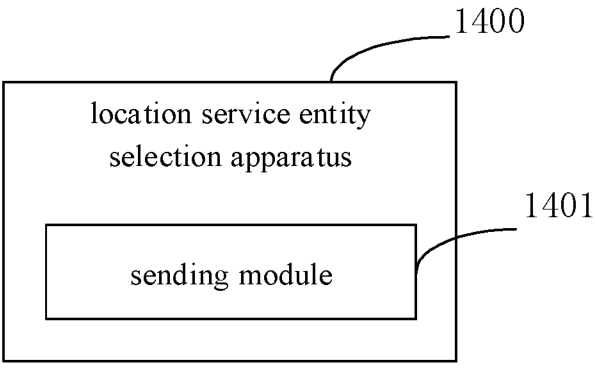
FIG. 14 is a schematic structural diagram of a location service entity selection apparatus according to the present disclosure.

FIG. 14 is a schematic structural diagram of a location service entity selection apparatus according to the present disclosure. The location service entity selection apparatus may be provided in a functional entity including a preset storage space. As shown in FIG. 14, a location service entity selection apparatus 1400 may include a sending module 1401.

The sending module 1401 is configured to send service capability information of a candidate location service entity in a preset storage space to a target functional entity, so as to allow the target functional entity to determine a target location service entity according to the service capability information of the candidate location service entity.

The service capability information of the candidate location service entity is information acquired from the preset storage space according to location requirement information of a UE.

The location requirement information of the UE includes access location information of the UE and/or access network information of the UE. The access location information of the UE may indicate current location information of the UE. In some implementations, the access location information of the UE includes any one or more of a TA accessed by the UE, an access cell of the UE, or an access base station of the UE. For example, the access location information of the UE includes a TA currently accessed by the UE, or a TA which is last accessed by the UE and is perceivable by a current functional entity. The access network information of the UE includes information about a network accessed by the UE. In some implementations, a CAG identifier may be used to represent the access network information of the UE. For example, the access network information of the UE includes a list of CAG identifiers supported by a current access cell of the UE or a subset of the list, or a list of CAG identifiers of CAGs which the UE is allowed to access or a subset of the list.

A location service entity includes a Location Management Function entity LMF and/or a Gateway Mobile Location Center entity GMLC, and the candidate location service entity includes one or more location service entities selected from location service entities according to the location requirement information of the UE. The service capability information of the candidate location service entity includes service area information of the candidate location service entity and/or service network information of the candidate location service entity. The service area information of the candidate location service entity is used for indicating information about an area where the candidate location service entity can provide a service. In some implementations, the service area information of the candidate location service entity includes one TA or a group of TAs, and indicates that the candidate location service entity can provide a location service in the TA or the TAs. The service network information of the candidate location service entity is used for indicating information about a network for which the candidate location service entity can provide a service. In some implementations, the service network information of the candidate location service entity includes one CAG identifier or a group of CAG identifiers, and indicates that the candidate location service entity can provide a location service for a network corresponding to the CAG identifier or the CAG identifiers.

In some implementations, the current functional entity includes a Unified Data Management entity UDM or a Network Function Repository Function entity NRF. Correspondingly, the preset storage space includes a storage space set in the UDM or a storage space set in the NRF.

In a case where the current functional entity is the UDM, the sending module 1401 includes a third sending unit, which is configured to return, in response to a location-service-entity subscription data acquisition request sent by the target functional entity, a location-service-entity subscription data feedback message to the target functional entity, so as to allow the target functional entity to acquire the service capability information of the candidate location service entity according to the location-service-entity subscription data feedback message and determine the target location service entity according to the service capability information of the candidate location service entity; and the location-service-entity subscription data acquisition request includes the location requirement information of the UE, and the location-service-entity subscription data feedback message includes the service capability information of the candidate location service entity.

In a case where the current functional entity is the NRF, the sending module 1401 includes a fourth sending unit, which is configured to return, in response to a location-service-entity discovery request sent by the target functional entity, a location-service-entity discovery feedback message to the target functional entity, so as to allow the target functional entity to acquire the service capability information of the candidate location service entity according to the location-service-entity discovery feedback message and determine the target location service entity according to the service capability information of the candidate location service entity; and the location-service-entity discovery request includes the location requirement information of the UE, and the location-service-entity discovery feedback message includes the service capability information of the candidate location service entity.

In this implementation, the sending module sends the service capability information of the candidate location service entity in the preset storage space to the target functional entity, so as to allow the target functional entity to determine the target location service entity according to the service capability information of the candidate location service entity. Thus, a functional entity having a location service requirement can determine, according to service capability information of the location service entities in the preset storage space, the candidate location service entity matched with the location requirement information of the UE, and can further select the target location service entity from the matched candidate location service entity, so that the target location service entity better meeting a user requirement can be obtained, and positioning service experience of users can be effectively improved in a case of providing a positioning service for the UE based on the target location service entity.

Figure 15:
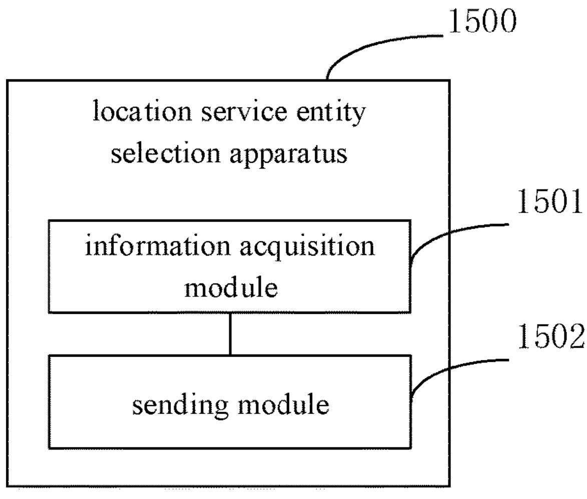
FIG. 15 is a schematic structural diagram of a location service entity selection apparatus according to the present disclosure.

FIG. 15 is a schematic structural diagram of a location service entity selection apparatus according to the present disclosure. The location service entity selection apparatus may be provided in a functional entity including a preset storage space. As shown in FIG. 15, a location service entity selection apparatus 1500 may include an information acquisition module 1501 and a sending module 1502.

The information acquisition module 1501 is configured to acquire service capability information of a candidate location service entity from a preset storage space according to location requirement information of a user equipment (UE).

In some implementations, in a case where a current functional entity is a Unified Data Management entity UDM, the information acquisition module 1501 includes a first information acquisition unit, a second information acquisition unit, and a third information acquisition unit. The first information acquisition unit is configured to determine the candidate location service entity according to access location information of the UE and service area information of a first location service entity; the second information acquisition unit is configured to determine the candidate location service entity according to access network information of the UE and service network information of the first location service entity; and the third information acquisition unit is configured to determine the candidate location service entity according to the access location information and the access network information of the UE and the service area information and the service network information of the first location service entity. Service capability information of the first location service entity is stored in a storage space in the UDM.

In some exemplary implementations, the UDM includes a first receiving module, a first sending module, and a first storage module. The first receiving module is configured to receive a location-service-entity subscription request sent by the UE, with the location-service-entity subscription request including service capability information of a location service entity subscribing to the UE; and the first sending module is configured to return a location-service-entity subscription feedback message to the UE. Moreover, the UDM acquires the service capability information of the first location service entity according to the location-service-entity subscription request, and stores the service capability information of the first location service entity in the preset storage space through the first storage module; and the first location service entity is the location service entity subscribing to the UE.

In some other implementations, in a case where the current functional entity is a Network Function Repository Function entity NRF, the information acquisition module 1501 includes a fourth information acquisition unit, a fifth information acquisition unit, and a sixth information acquisition unit. The fourth information acquisition unit is configured to determine the candidate location service entity according to access location information of the UE and service area information of a second location service entity; the fifth information acquisition unit is configured to determine the candidate location service entity according to access network information of the UE and service network information of the second location service entity; and the sixth information acquisition unit is configured to determine the candidate location service entity according to the access location information and the access network information of the UE and the service area information and the service network information of the second location service entity. Service capability information of the second location service entity is stored in a storage space in the NRF.

In some exemplary implementations, the NRF includes a second receiving module, a second sending module, and a second storage module. The second receiving module is configured to receive a location-service-entity registration request sent by a location service entity and/or a location-service-entity registration update request sent by a location service entity, with the location-service-entity registration request and/or the location-service-entity registration update request including service capability information of the location service entity to be registered and/or service capability information of the location service entity to be subjected to registration updating; and the second sending module is configured to return a location-service-entity registration response message and/or a location-service-entity registration update response message to the location service entity. Moreover, the NRF acquires the service capability information of the second location service entity according to the location-service-entity registration request and/or the location-service-entity registration update request, and stores the service capability information of the second location service entity in the preset storage space through the second storage module; and the second location service entity is the location service entity to be registered and/or the location service entity to be subjected to registration updating.

The sending module 1502 is configured to send the service capability information of the candidate location service entity in the preset storage space to a target functional entity, so as to allow the target functional entity to determine a target location service entity according to the service capability information of the candidate location service entity.

It should be noted that the sending module 1502 in this implementation is the same as the sending module 1401 in the aforesaid implementation, and thus will not be repeated here.

Figure 16:
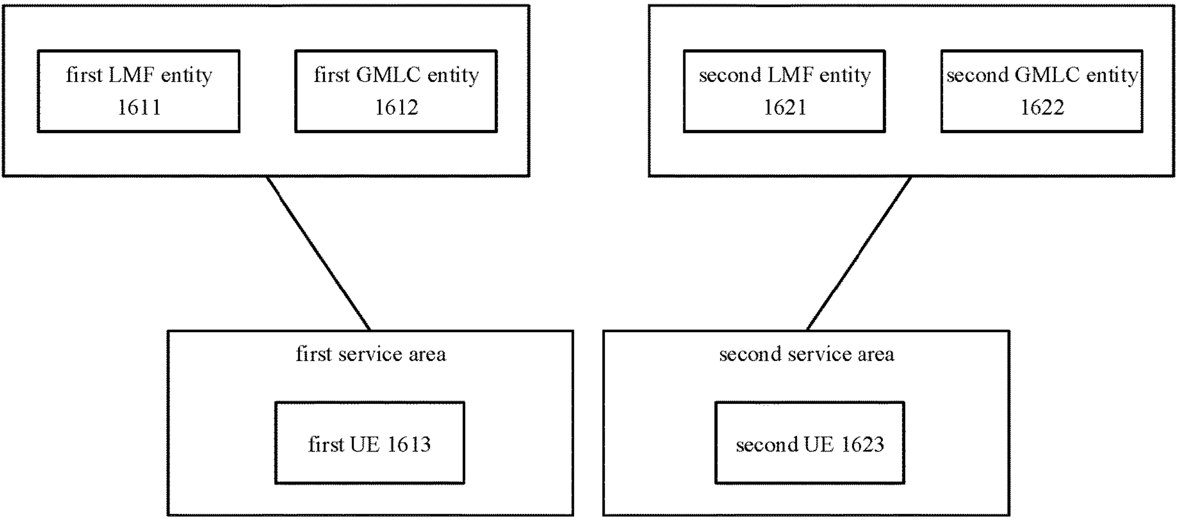
FIG. 16 is a schematic diagram illustrating a scenario of selection of a location service entity according to the present disclosure.

FIG. 16 is a schematic diagram illustrating a scenario of selection of a location service entity according to the present disclosure. As shown in FIG. 16, in this scenario, different Location Management Function (LMF) entities and Gateway Mobile Location Center (GMLC) entities are deployed for different areas.

Illustratively, a first LMF entity 1611 and a first GMLC entity 1612 are deployed in a sinking deployment manner to provide location services for a first service area, and a second LMF entity 1621 and a second GMLC entity 1622 are deployed in a sinking deployment manner to provide location services for a second service area.

In a case where an access location of a first UE 1613 is located in the first service area, the access location of the first UE 1613 is matched with the first service area, so that, according to the location service entity selection method provided in the implementations of the present disclosure, the first UE 1613 may use the location services provided by the first LMF entity 1611 and/or the first GMLC entity 1612 corresponding to the first service area.

Similarly, in a case where an access location of a second UE 1623 is located in the second service area, the access location of the second UE 1623 is matched with the second service area, so that, according to the location service entity selection method provided in the implementations of the present disclosure, the second UE 1623 may use the location services provided by the second LMF entity 1621 and/or the second GMLC entity 1622 corresponding to the second service area.

Figures 17, 18:
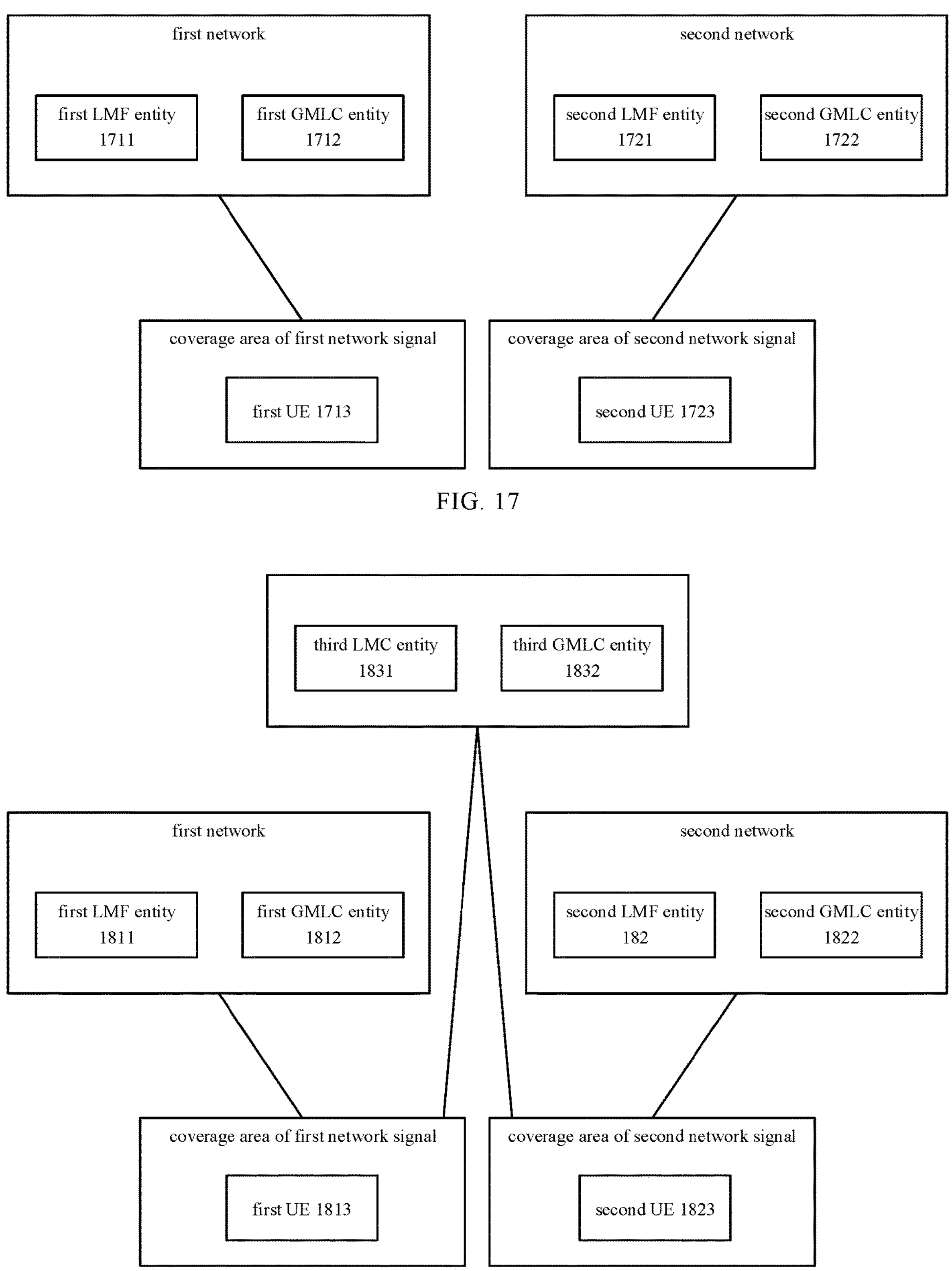
FIG. 17 is a schematic diagram illustrating another scenario of selection of a location service entity according to the present disclosure.
FIG. 18 is a schematic diagram illustrating yet another scenario of selection of a location service entity according to the present disclosure.

FIG. 17 is a schematic diagram illustrating another scenario of selection of a location service entity according to the present disclosure. As shown in FIG. 17, in this scenario, different LMF entities and GMLC entities are deployed for different networks.

Illustratively, a first LMF entity 1711 and a first GMLC entity 1712 are independently deployed to provide location services for a first network, and a second LMF entity 1721 and a second GMLC entity 1722 are independently deployed to provide location services for a second network.

When a first UE 1713 enters a coverage area of a first network signal and has access to the first network, an access network of the first UE 1713 is the same as the first network, so that, according to the location service entity selection method provided in the implementations of the present disclosure, the first UE 1713 may use the location services provided by the first LMC entity 1711 and/or the first GLMC entity 1712 corresponding to the first network.

Similarly, when a second UE 1723 enters a coverage area of a second network signal and has access to the second network, an access network of the second UE 1723 is the same as the second network, so that, according to the location service entity selection method provided in the implementations of the present disclosure, the second UE 1723 may use the location services provided by the second LMC entity 1721 and/or the second GLMC entity 1722 corresponding to the second network.

FIG. 18 is a schematic diagram illustrating yet another scenario of selection of a location service entity according to the present disclosure. As shown in FIG. 18, in this scenario, different LMF entities and GMLC entities are deployed for different areas and different networks.

Illustratively, a first LMC entity 1811 and a first GMLC entity 1812 are independently deployed to provide location services for a first network, a second LMC entity 1821 and a second GMLC entity 1822 are independently deployed to provide location services for a second network, and a third LMC entity 1831 and a third GMLC entity 1832 are deployed in a centralized deployment manner to provide location services for UEs which are located in all areas and have access to any network.

Based on this, when a first UE 1813 enters a coverage area of a first network signal and has access to the first network, an access location of the first UE 1813 is matched with a service area of the first network, and an access network of the first UE 1813 is the same as the first network; and meanwhile, the access location and the access network of the first UE 1813 are also matched with the deployment situations of the third LMC entity 1831 and the third GMLC entity 1832. Thus, according to the location service entity selection method provided in the implementations of the present disclosure, the first UE 1813 may not only use the location services provided by the first LMC entity 1811 and/or the first GMLC entity 1812 corresponding to the first network, but may also use the location services provided by the third LMC entity 1831 and/or the third GMLC entity 1832.

Similarly, when a second UE 1823 enters a coverage area of a second network signal and has access to the second network, an access location of the second UE 1823 is matched with a service area of the second network, and an access network of the second UE 1823 is the same as the second network; and meanwhile, the access location and the access network of the second UE 1823 are also matched with the deployment situations of the third LMC entity 1831 and the third GMLC entity 1832. Thus, according to the location service entity selection method provided in the implementations of the present disclosure, the second UE 1823 may not only use the location services provided by the second LMC entity 1821 and/or the second GMLC entity 1822 corresponding to the second network, but may also use the location services provided by the third LMC entity 1831 and/or the third GMLC entity 1832.

It should be noted that one LMC entity and one GMLC entity are deployed for the first network/the second network in this implementation, but that is merely an example for illustrating the deployment of the location service entities in the network, and is not intended to limit the number of the location service entities in the network.

Figure 19:
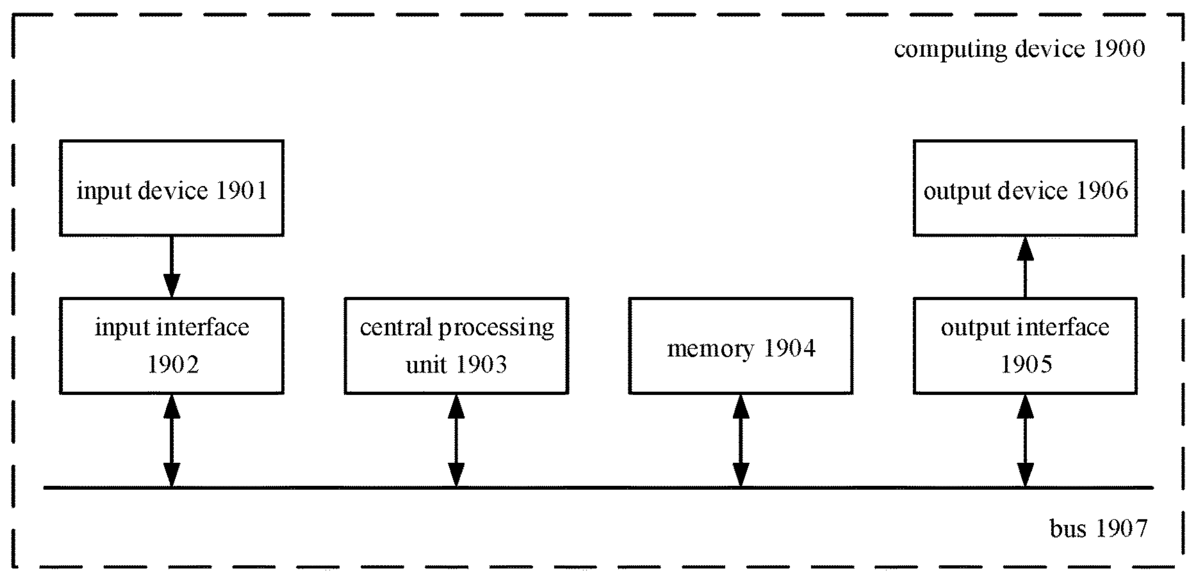
FIG. 19 is a block diagram of an exemplary hardware architecture of a computing device capable of implementing the location service entity selection method and apparatus according to the present disclosure.

FIG. 19 is a block diagram of an exemplary hardware architecture of a computing device capable of implementing the location service entity selection method and apparatus according to the present disclosure.

As shown in FIG. 19, a computing device 1900 includes an input device 1901, an input interface 1902, a central processing unit 1903, a memory 1904, an output interface 1905, and an output device 1906. The input interface 1902, the central processing unit 1903, the memory 1904, and the output interface 1905 are connected to each other through a bus 1907, and the input device 1901 and the output device 1906 are connected to the bus 1907 through the input interface 1902 and the output interface 1905 respectively, and are further connected to other components of the computing device 1900.

Illustratively, the input device 1901 receives input information from the outside, and transmits the input information to the central processing unit 1903 through the input interface 1902; the central processing unit 1903 processes the input information based on a computer-executable instruction stored in the memory 1904 to generate output information, stores the output information temporarily or permanently in the memory 1904, and then transmits the output information to the output device 1906 through the output interface 1905; and the output device 1906 outputs the output information from the computing device 1900 for users to use.

In an implementation, the computing device shown in FIG. 19 may be implemented as an electronic device, which may include: a memory configured to store a program; and a processor configured to run the program stored in the memory to perform the location service entity selection method described in any one of the above implementations.

In an implementation, the computing device shown in FIG. 19 may be implemented as a location service entity selection system, which may include: a memory configured to store a program; and a processor configured to run the program stored in the memory to perform the location service entity selection method described in any one of the above implementations.

According to the location service entity selection method and apparatus, the electronic device, and a readable storage medium provided in the implementations of the present disclosure, the service capability information of the candidate location service entity is acquired from the preset storage space according to the location requirement information of the user equipment (UE), and the target location service entity is determined according to the service capability information of the candidate location service entity, with the preset storage space including the local storage space set in the current functional entity or the remote storage space set in the functional entity except for the current functional entity. The candidate location service entity matched with the location requirement information of the user equipment (UE) is determined based on the service capability information of the location service entities which is stored in the current functional entity or the other functional entities, and the target location service entity is further selected from the matched candidate location service entity, so that the target location service entity better meeting the user requirement can be obtained, and positioning service experience of users can be effectively improved in a case of providing a positioning service for the UE based on the target location service entity.

The above description is merely of the exemplary implementations of the present disclosure, and is not intended to limit the scope of the present disclosure. In general, the various implementations of the present disclosure may be implemented by hardware or special circuits, software, logic or any combination thereof. For example, some aspects of the present disclosure may be implemented by hardware and other aspects may be implemented by firmware or software executable by a controller, a microprocessor or other computing devices, but the present disclosure is not limited thereto.

The implementations of the present disclosure may be implemented by a data processor of a mobile device executing computer program instructions. For example, the implementations of the present disclosure are implemented in a processor entity, or by hardware, or by a combination of software and hardware. The computer program instructions may be assembly instructions, Instruction Set Architecture (ISA) instructions, machine instructions, machine-related instructions, microcode, firmware instructions, state setting data, or source code or object code written in one programming language or in any combination of a plurality of programming languages.

A block diagram illustrating any logic flow in the drawings of the present disclosure may show operations of a program, or interconnected logic circuits, modules and functions, or a combination of the operations of the program and the logic circuits, modules and functions. The computer program can be stored on a memory. The memory may be of any type suitable to local technical environment and may be implemented using any suitable data storage technology. For example, the memory is, but not limited to, a Read-Only Memory (ROM), a Random Access Memory (RAM), and an optical storage device and system (a Digital Video Disc (DVD) or a Compact Disc (CD)). A computer-readable medium may include a non-transitory storage medium. The data processor may be of any type suitable to the local technical environment. For example, the data processor is, but not limited to, a general-purpose computer, a special purpose computer, a microprocessor, a Digital Signal Processors (DSP), an Application Specific Integrated Circuit (ASIC), a Field Programmable Gate Array (FGPA), and a processor based on multi-core architecture.

The exemplary implementations of the present disclosure are illustrated in detail above by exemplary and non-limiting examples. For those of ordinary skill in the art, various modifications and adjustments to the above implementations can be obviously derived from the accompanying drawings and the appended claims, but those modifications and adjustments are not beyond the scope of the present disclosure. Therefore, the proper scope of the present disclosure is defined by the appended claims.

What is claimed is:

1. A method for selecting a location service entity, comprising:

acquiring service capability information of a candidate location service entity from a preset storage space according to location requirement information of a user equipment (UE); and determining a target location service entity according to the service capability information of the candidate location service entity, wherein the location service entity comprises a Location Management Function entity (LMF) and/or a Gateway Mobile Location Center entity (GMLC); and the service capability information of the candidate location service entity comprises service area information of the candidate location service entity and/or service network information of the candidate location service entity, and the location requirement information of the UE comprises access location information of the UE and/or access network information of the UE, wherein the preset storage space comprises a remote storage space comprising a storage space set in a Unified Data Management entity (UDM); and acquiring the service capability information of the candidate location service entity from the preset storage space according to the location requirement information of the UE comprises: sending a location-service-entity subscription data acquisition request to the UDM; wherein the location-service-entity subscription data acquisition request comprises the location requirement information of the UE; and receiving a location-service-entity subscription data feedback message returned by the UDM; wherein the location-service-entity subscription data feedback message comprises the service capability information of the candidate location service entity, the service capability information of the candidate location service entity is information determined by the UDM according to the location requirement information of the UE and service capability information of a first location service entity, and the service capability information of the first location service entity is pre-stored in the storage space in the UDM, or, wherein the preset storage space comprises a remote storage space comprising a storage space set in a Network Function Repository Function entity (NRF); and acquiring the service capability information of the candidate location service entity from the preset storage space according to the location requirement information of the UE comprises: sending a location-service-entity discovery request to the NRF; wherein the location-service-entity discovery request comprises the location requirement information of the UE; and receiving a location-service-entity discovery feedback message returned by the NRF; wherein the location-service-entity discovery feedback message comprises the service capability information of the candidate location service entity, the service capability information of the candidate location service entity is information determined by the NRF according to the location requirement information of the UE and service capability information of a second location service entity, and the service capability information of the second location service entity is pre-stored in the storage space in the NRF.

2. The method of claim 1, wherein in a case where the remote storage space comprises the storage space set in the UDM, the service capability information of the first location service entity is information acquired by the UDM according to a location-service-entity subscription request sent by the UE; wherein the location-service-entity subscription request comprises service capability information of a location service entity subscribing to the UE.

3. The method of claim 1, wherein in a case where the remote storage space comprises the storage space set in the NRF, the service capability information of the second location service entity is information acquired by the NRF according to a location-service-entity registration request sent by a location service entity and/or a location-service-entity registration update request sent by a location service entity; wherein the location-service-entity registration request and/or the location-service-entity registration update request comprise/comprises service capability information of the location service entity to be registered and/or service capability information of the location service entity to be subjected to registration updating.

4. The method of claim 1, wherein before acquiring the service capability information of the candidate location service entity from the preset storage space according to the location requirement information of the UE, the method further comprises:

determining a location service policy of a current functional entity; and determining the preset storage space according to the location service policy of the current functional entity.

5. The method of claim 4, wherein the location service policy comprises any one of a subscription location service policy, or a remote query location service policy, determining the preset storage space according to the location service policy of the current functional entity comprises:

in a case where the location service policy of the current functional entity is the subscription location service policy, determining the preset storage space to be the remote storage space set in the UDM; and in a case where the location service policy of the current functional entity is the remote query location service policy, determining the preset storage space to be the remote storage space set in the NRF, or, wherein after determining the location service policy of the current functional entity, the method further comprises:

in a case where the location service policy of the current functional entity is in a default state, sending the location-service-entity subscription data acquisition request to the UDM.

6. The method of claim 1, wherein determining the target location service entity according to the service capability information of the candidate location service entity comprises:

determining a service capability grade of the candidate location service entity according to the service capability information of the candidate location service entity; and determining the target location service entity according to the service capability grade of the candidate location service entity, or, wherein the service capability information of the candidate location service entity further comprises service slice information of the candidate location service entity; and determining the target location service entity according to the service capability information of the candidate location service entity comprises:

determining the target location service entity according to the service slice information of the candidate location service entity; wherein the target location service entity is a candidate location service entity matched with an access slice of the UE.

7. A method for selecting a location service entity, comprising:

acquiring service capability information of a candidate location service entity from a preset storage space according to location requirement information of a user equipment (UE); and sending the service capability information of the candidate location service entity in the preset storage space to a target functional entity, so as to allow the target functional entity to determine a target location service entity according to the service capability information of the candidate location service entity;

wherein the location service entity comprises a Location Management Function entity (LMF) and/or a Gateway Mobile Location Center entity (GMLC); and the service capability information of the candidate location service entity comprises service area information of the candidate location service entity and/or service network information of the candidate location service entity, and the location requirement information of the UE comprises access location information of the UE and/or access network information of the UE, wherein a current functional entity is a Network Function Repository Function entity (NRF):

before acquiring the service capability information of the candidate location service entity from the preset storage space according to the location requirement information of the UE, the method further comprises:

receiving a location-service-entity registration request sent by a location service entity and/or a location-service-entity registration update request sent by a location service entity; wherein the location-service-entity registration request and/or the location-service-entity registration update request comprise/comprises service capability information of the location service entity to be registered and/or service capability information of the location service entity to be subjected to registration updating; and returning a location-service-entity registration response message and/or a location-service-entity registration update response message to the location service entity.

8. The method of claim 7, wherein after receiving the location-service-entity registration request sent by the location service entity and/or the location-service-entity registration update request sent by the location service entity, the method further comprises:

acquiring service capability information of a second location service entity according to the location-service-entity registration request and/or the location-service-entity registration update request; wherein the service capability information of the second location service entity is stored in a storage space in the NRF.

9. The method of claim 8, wherein acquiring the service capability information of the candidate location service entity from the preset storage space according to the location requirement information of the UE comprises:

determining the candidate location service entity according to the access location information of the UE and service area information of the second location service entity; or determining the candidate location service entity according to the access network information of the UE and service network information of the second location service entity; or determining the candidate location service entity according to the access location information and the access network information of the UE and the service area information and the service network information of the second location service entity.

10. The method of claim 9, wherein sending the service capability information of the candidate location service entity in the preset storage space to the target functional entity so as to allow the target functional entity to determine the target location service entity according to the service capability information of the candidate location service entity comprises:

in response to a location-service-entity discovery request sent by the target functional entity, returning a location-service-entity discovery feedback message to the target functional entity, so as to allow the target functional entity to acquire the service capability information of the candidate location service entity according to the location-service-entity discovery feedback message and determine the target location service entity according to the service capability information of the candidate location service entity; wherein the location-service-entity discovery request comprises the location requirement information of the UE, and the location-service-entity discovery feedback message comprises the service capability information of the candidate location service entity.

11. A method for selecting a location service entity, comprising:

acquiring service capability information of a candidate location service entity from a preset storage space according to location requirement information of a user equipment (UE); and sending the service capability information of the candidate location service entity in the preset storage space to a target functional entity, so as to allow the target functional entity to determine a target location service entity according to the service capability information of the candidate location service entity;

wherein the location service entity comprises a Location Management Function entity (LMF) and/or a Gateway Mobile Location Center entity (GMLC); and the service capability information of the candidate location service entity comprises service area information of the candidate location service entity and/or service network information of the candidate location service entity, and the location requirement information of the UE comprises access location information of the UE and/or access network information of the UE, wherein a current functional entity is a Unified Data Management entity (UDM);

before acquiring the service capability information of the candidate location service entity from the preset storage space according to the location requirement information of the UE, the method further comprises:

receiving a location-service-entity subscription request sent by the UE; wherein the location-service-entity subscription request comprises service capability information of a location service entity subscribing to the UE; and returning a location-service-entity subscription feedback message to the UE.

12. The method of claim 11, wherein after receiving the location-service-entity subscription request sent by the UE, the method further comprises:

acquiring service capability information of a first location service entity according to the location-service-entity subscription request; wherein the service capability information of the first location service entity is stored in a storage space in the UDM.

13. The method of claim 12, wherein acquiring the service capability information of the candidate location service entity from the preset storage space according to the location requirement information of the UE comprises:

determining the candidate location service entity according to the access location information of the UE and service area information of the first location service entity; or determining the candidate location service entity according to the access network information of the UE and service network information of the first location service entity; or determining the candidate location service entity according to the access location information and the access network information of the UE and the service area information and the service network information of the first location service entity.

14. The method of claim 13, wherein sending the service capability information of the candidate location service entity in the preset storage space to the target functional entity so as to allow the target functional entity to determine the target location service entity according to the service capability information of the candidate location service entity comprises:

in response to a location-service-entity subscription data acquisition request sent by the target functional entity, returning a location-service-entity subscription data feedback message to the target functional entity, so as to allow the target functional entity to acquire the service capability information of the candidate location service entity according to the location-service-entity subscription data feedback message and determine the target location service entity according to the service capability information of the candidate location service entity; wherein the location-service-entity subscription data acquisition request comprises the location requirement information of the UE, and the location-service-entity subscription data feedback message comprises the service capability information of the candidate location service entity.

15. An electronic device, comprising:

one or more processors; and a memory having stored thereon one or more programs which, when executed by the one or more processors, cause the one or more processors to implement the method for selecting the location service entity of claim 1.

16. An electronic device, comprising:

one or more processors; and a memory having stored thereon one or more programs which, when executed by the one or more processors, cause the one or more processors to implement the method for selecting the location service entity of claim 7.

17. An electronic device, comprising:

one or more processors; and a memory having stored thereon one or more programs which, when executed by the one or more processors, cause the one or more processors to implement the method for selecting the location service entity of claim 11.

* * * * *